United States Patent Office 3,556,943
Patented Jan. 19, 1971

3,556,943
METHOD FOR MICROBIOLIGICAL INTRODUCTION OF OXYGEN INTO HETEROCYCLIC NITROGEN COMPOUNDS
Gunther S. Fonken, Galesburg, Milton E. Herr, Kalamazoo, and Herbert C. Murray, Hickory Corners, Mich., assignors to The Upjohn Company, Kalamazoo, Mich., a corporation of Delaware
No Drawing. Continuation-in-part of application Ser. No. 453,204, May 4, 1965. This application Sept. 11, 1967, Ser. No. 666,991
Int. Cl. C12d 13/00
U.S. Cl. 195—51     17 Claims

ABSTRACT OF THE DISCLOSURE

A method for the microbiological introduction of oxygen into the heterocyclic ring of N-acyl derivatives of polymethyleneimines (azacycloalkanes) and azabicycloalkanes using *Sporotrichum sulfurescens* to obtain the corresponding oxygenated products.

CROSS REFERENCE

This application is a continuation-in-part of copending application Ser. No. 453,204, filed May 4, 1965 and now abandoned.

BACKGROUND OF THE INVENTION

This invention relates to a bioconversion process to obtain oxygenated polymethyleneimines and azabicycloalkanes, some of which are known but which have not hitherto been readily available by purely chemical methods of synthesis.

SUMMARY OF THE INVENTION

This invention relates to a novel method for the introduction of oxygen into the heterocyclic ring of N-acyl derivatives of polymethyleneimines (azacycloalkanes) and azabicycloalkanes. More particularly this invention relates to the introduction of oxygen into the meterocyclic ring of N-aromatic acyl derivatives of polymethyleneimines (azacycloalkanes) and azabicycloalkanes by subjecting them to the oxygenating activity of the microorganism *Sporotrichum sulfurescens*, to certain novel products produced by the process of this invention and to derivatives thereof.

DETAILED DESCRIPTION OF THE INVENTION

The process of this invention is of particular value for the introduction of oxygen into the heterocyclic ring of compounds having the formula:

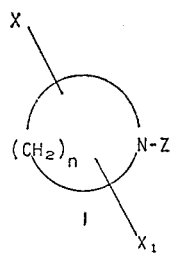

wherein $n$ is a whole number from 4 to 12, inclusive, X and $X_1$ are each selected from the group consisting of hydrogen, methyl, ethyl, and propyl, and X and $X_1$ taken together constitute a bridge containing from 1 to 3 carbon atoms, inclusive, and Z is selected from the group consisting of

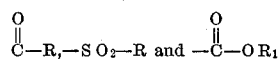

in which R is aryl, and $R_1$ is aralkyl.

The above compounds of Formula I when subjected to the bioconversion process of this invention give rise to the corresponding compounds wherein the heterocyclic ring has been oxygenated by the introduction of a hydroxy or keto group as represented by Formula Ia.

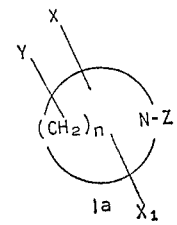

wherein X, $X_1$ and Z have the meanings previously given and Y is hydroxy or keto.

The bioconversion process of this invention when applied to the compounds of Formula I, which contain one or more attached alkyl groups, namely, the compounds of Formula I wherein X and $X_1$ are methyl, ethyl or propyl also give rise to the corresponding compounds wherein the alkyl side chain has been oxygenated by the introduction of a hydroxy or keto group. These compounds are likewise useful for the same purposes as hereinafter given for the compounds in which the heterocyclic ring has been oxygenated.

The bioconversion process of this invention is of particular value for the production of compounds having the formula:

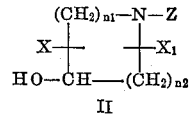

wherein X, $X_1$ and Z have the meanings previously given, $n_1$ is a whole number from 1 to 5, inclusive, and $n_2$ is a whole number from 2 to 8, inclusive, in which the sum of $n_1$ and $n_2$ is not less than 3 and not more than 11.

The compounds produced by the bioconversion process of this invention, wherein the introduced oxygen substituent is hydroxy, for example the compounds of Formula II, can be chemically oxidized by methods hereinafter disclosed, for example using chromic acid, to obtain the corresponding keto compounds, particularly those having the formula:

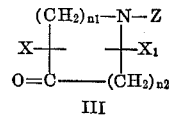

wherein $n_1$, $n_2$, X, $X_1$ and Z have the meanings and limitations previously given.

The compounds produced by the bioconversion process wherein the introduced oxygen substituent is keto, or the keto compounds produced by the above chemical oxidation step, can if desired be reduced by methods hereinafter disclosed, for example using sodium borohydride, to obtain the corresponding hydroxy compounds.

While the process of the invention is of general applicability and can be employed for the oxygenation of all of the N-acyl derivatives of polymethyleneimines and azabicycloalkanes of Formula I, above, to obtain the oxygenated compounds of Formulae II and III, above, the process of the invention is especially advantageous for obtaining compounds of the invention as represented by Formulae IV, V, VI and VII below:

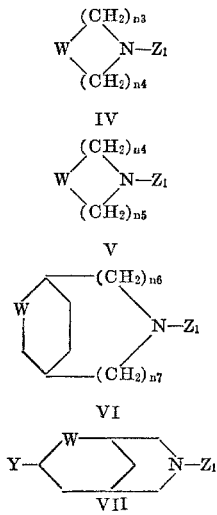

wherein $n_3$ is a whole number from 1 to 3, inclusive, $n_4$ is a whole number from 3 to 5, inclusive, and $n_5$ is a whole number from 6 to 8, inclusive, in which the sum of $n_3$ and $n_4$ is not less than 5 and not greater than 7 and the sum of $n_4$ and $n_5$ is 11, $n_6$ is 0 or 1 and $n_7$ is 0 or 1, in which $n_6$ and $n_7$ cannot each equal 0 simultaneously; W is a radical selected from the group consisting of carbonyl, hydroxymethylene, acyloxymethylene, methylhydroxymethylene, phenylhydroxymethylene, alkylenedioxymethylene, and cyclicaminomethylene; $Z_1$ is selected from the group consisting of hydrogen, cycloalkyl, cyanomethyl, 2-aminoethyl, 2-guanidinoethyl,

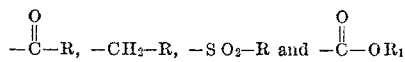

in which R is aryl and $R_1$ is aralkyl, and Y is hydrogen, halogen, hydroxy or alkoxy.

In this application the term "aryl" means an aryl radical of 6 to 12 carbon atoms, inclusive, such as, for example, phenyl, tolyl, xylyl, naphthyl, biphenylyl and the like. The term "aralkyl" means an aralkyl radical of 7 to 16 carbon atoms, inclusive, such as benzyl, p-nitrobenzyl, 4-methylbenzyl, 3-methylbenzyl, 4-methylphenethyl, 4-biphenylbutyl, α-naphthylmethyl, β-naphthylethyl, and the like. The term "acyloxymethylene" means a substituent wherein the acyl radical is that of an organic carboxylic acid of from 1 to 16 carbon atoms, inclusive, such as those hereinafter defined. The term "alkylenedioxymethylene" means the radical

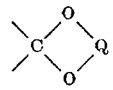

in which Q is a lower alkylene radical containing from 2 to 8 carbon atoms, inclusive, and having from 2 to 3 carbon atoms, inclusive, in the chain connecting the oxygen atoms. The term "cyclicaminomethylene" means the radical

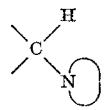

in which the symbol $-\text{N}\bigcirc$ is a saturated 5 to 9 ring atom cyclic amino radical such as those hereinafter listed. The term "cycloalkyl" means a cycloalkyl radical of 5 to 15 carbon atoms inclusive, such as cyclopentyl, cyclohexyl, cyclooctyl, cyclodecyl, cyclopentadecyl and the like. The term "alkoxy" means an alkoxy radical wherein alkyl is an alkyl radical of 1 to 6 carbon atoms.

The oxygenated compounds produced by the bioconversion and oxidation processes of this invention and the derivatives thereof, including those represented by Formulae II, III, IV, V, VI and VII, above; and the compounds produced in the examples appended hereto are useful as insecticides, fungicides, parasiticides, protein denaturants, insect repellants, high boiling solvents, plasticizers for synthetic resins, crosslinking agents for fiber synthesis, pharmacologic agents for psychic control effects and as intermediates for dyes, polymers and fibers.

As an example of their use as intermediates the compounds wherein the oxygen substituent is keto (the hydroxy compounds can be oxidized to keto) can be converted to lactams which can by hydrolyzed to amino acids in accordance with the procedures disclosed in U.S. Pats. 2,579,851 and 2,569,114. For example, the ketones are converted to the oximes by reacting them with hydroxylamine or a salt thereof. The oximes are then subjected to a Beckman rearrangement by treatment with sulfuric acid or the equivalent to produce lactams. The lactams thus produced are useful intermediates giving on hydrolysis amino acids. The lactams and amino acids thus obtained are useful for the manufacture of valuable products, for example, polyamides, as disclosed in U.S. Pat. 2,579,851, supra.

For use as insect repellents the compounds of this invention can be formulated with aqueous or nonaqueous carriers in accordance with methods known in the art, for example, U.S. Pat. 3,131,215.

The microbiological process of this invention comprises subjecting an N-aromatic acyl derivative of a methyleneimine (I) to the oxygenating activity of the species of fungus Sporotrichum sulfurescens. The genus Sporotrichum belongs to the family Moniliaceae of the order Moniliales of the class Deuteromycetes.

The typical strain preferred for the practice of this invention is Sporotrichum sulfurescens, available from the American Type Culture Collection, Washington, D.C., Collection No. ATCC 7159. It is to be understood, however, that other strains of Sprootrichum sulfurescens are suitable for the practice of this invention.

The starting materials (I) for the process of this invention, some of which are known, are prepared from polymethyleneimines (azacycloalkanes) and azabicycloalkanes of the formula:

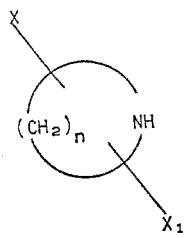

wherein $n$, X and $X_1$ have the meanings previously given, by methods known in the art for acylating polymethyleneimines. For example, the selected polymethyleneimine or azabicycloalkane is dissolved, mixed or suspended in an aqueous sodium hydroxide solution and reacted with the acid halide of the appropriate monobasic aryl or aralkyl carboxylic acid, such as those, hereinafter listed as acylating agents, or with the acid halide of the appropriate monobasic aryl sulfonic acid such as, for example, benzenesulfonic acid, o-, m-, p-toluenesulfonic acids, α- and β-naphthalene sulfonic acids, p-chlorobenzenesulfonic acid and the like, as illustrated by Preparations 1 through 10, herein. The acylation may also be carried out in hydrocarbon solvents such as, e.g., Skellysolve B (mixed hexanes), benzene or toluene. In carrying out the bioconversion process of this invention the operational conditions and reaction procedures are advantageously those known in the art of bioconversion as illustrated in Murray et al., U.S. Pats. 2,602,769 and 2,735,800, utilizing the oxygenating activity of the microorganism *Sporotrichum sulfurescens*.

In the practice of this invention, the bioconversion can be effected by a growing or resting culture of the microorganism or by spores, washed cells or enzymes of the microorganism.

Culture of the microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines, starches; meat extracts, peptones, amino acids, proteins, fatty acids, glycerol, whey and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 through a higher or lower pH can be used. A temperature between about 25 to 32° C. is preferred for growth of the microorganism but higher or lower temperatures within a relatively wide range are suitable.

The substrate can be added to the culture during the growth period of the microorganism as a single feed or by gradual addition during the conversion period or it can be added to the medium before or after sterilization or inoculation making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate, when it is a solid, in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such range as supports life, active growth or the enzyme activity of the microorganism; the range of 20 to 35° C. is preferred. A pH of about 4 to 6 is generally preferred for growth of the microorganism during the bioconversion but for acid-sensitive substrates, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961), Reinhold Publishing Co., New York, N.Y.].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Pats. 3,031,379 and 3,031,382. The separation of washed cells from the fermentation medium is well known in the art, see for example U.S. Patent 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate, under aerobic fermentation conditions.

After completion of the fermentation, the resulting oxygenated products are recovered from the fermentation beer by conventional methods. For example, the whole beer can be extracted with a water-immiscible organic solvent such as methylene chloride, chloroform, carbon tetrachloride, ethylene chloride, trichloroethylene, ether, amyl acetate, benzene, and the like or the beer and mycelia can be separated by conventional methods such as centrifugation or filtration, and then separately extracted with suitable solvents. The mycelia can be extracted with either water-miscible or water-immiscible solvents or in cases where little or no product is contained in the mycelium, it can be merely washed with water and the wash water added to the beer filtrate. The beer, free of mycelia, can then be extracted with water-immiscible solvents such as those listed above. The extracts are combined, dried over a drying agent such as anhydrous sodium sulfate, and the solvent removed by conventional methods such as evaporation or distillation at atmospheric or reduced pressure. The oxygenated products thus obtained can be further purified by conventional methods, e.g., recrystallization, chromatography, distillation in the case of liquids, and the like.

Separation of the various oxygenated products obtained from the fermentation can be accomplished by conventional methods such as chromatography and/or fractional crystallization and, if liquids, by distillation. In instances when separation of the hydroxy compounds is difficult a convenient and advantageous method is first to oxidize under acidic neutral or slightly basic conditions the crude oxygenated polymethyleneimines or azabicycloalkanes obtained from the beer in accordance with methods known in the art for oxidizing secondary hydroxy groups to ketones, for example, Fieser and Fieser, Natural Products Related to Phenanthrene, 3rd ed., pp. 127–129, 193 and 194, Rheinhold Publishing Corporation, New York, N.Y. Thus, the crude bioconversion products are dissolved in an inert organic solvent such as acetone, benzene, methylene chloride, t-butanol, and the like, and then oxidized with aqueous chromic acid, potassium permanganate, t-butyl hypochloride or like oxidizing agents to convert the secondary hydroxy groups present to keto, thereby producing a mixture of the corresponding keto compounds which are in some cases more easily separated by chromatography and/or crystallization or distillation in the case of liquids.

The compounds obtained from the bioconversion wherein the introduced oxygen substitutent is keto or those prepared by the above chemical oxidation of the corresponding hydroxy compounds, for example, compounds of Formula III, can, if desired, be reduced, preferably under neutral or acidic conditions, in accordance with methods known in the art for reducing carbonyl groups to produce the corresponding hydroxy compounds. For example, reduction can be conveniently accomplished with hydrogen in the presence of a atalyst such as palladium, platinum or Raney nickel under neutral conditions; sodium in an alkanol; or with a reducing agent such as lithium aluminum hydride, sodium borohydride, primary isobutyl magnesium bromide or lithium tri-tertiary butoxy aluminum hydride, and the like.

The compounds obtained from the bioconversion wherein the introduced oxygen substitutent is hydroxy, for example the compounds of Formula II, can be acylated to give the corresponding acyloxy compounds in accordance with methods known in the art for acylating secondary hydroxy groups, for example, by reaction with the appropriate acid anhydride or acid halide, by reaction with the appropriate ester or by reaction with the appropriate acid in the presence of an esterification catalyst, etc. Suitable acylating agents are organic carboxylic acids, particularly hydrocarbon carboxylic acids containing from 1 to 16 carbon atoms, inclusive, or acid anhydrides or acid halides thereof. Illustrative of hydrocarbon carboxylic acids employed in the formation of the acylates are saturated and unsaturated aliphatic acids and aromatic aids such as acetic, porpionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like. If the acylating agent is free acid, the reaction is preferably effected in the presence of an esterification catalyst, for example p-toluenesulfonyl chloride, trifluoroacetic anhydride, p-toluenesulfonic acid, trifluoroacetic acid, sulfuric acid, and the like.

The compounds obtained from the bioconversion process wherein the introduced oxygen substitutent is keto or the keto compounds obtained by chemical oxidation of the corresponding hydroxy compounds such as the compounds of Formula III, can be converted to their common carbonyl derivatives such as oximes, hydrazones, semicarbazones, cyclic alkylene ketals and the like in accordance with methods well known in the art. For example, the carbonyl group can be ketalized by reacting the selected compound with an alkanediol selected from the group of vicinal alkane-1,2-diols and alkane-1,3-diols containing up to and including 8 carbon atoms, e.g., ethylene, propylene, trimethylene, 2,3-butylene, 2,4-pentylene, 4-methyl-1,2-pentylene, 1,3-hexylene, 1,2-heptylene, 3,4-heptylene, 1,3-octylene, and the like, preferably in an organic solvent such as benzene, toluene, xylene, methylene chloride, and the like and in the presence of an acid catalyst such as p-toluenesulfonic acid. The reaction is conducted at a temperature between about 20 and about 200° C., preferably between about 40 and about 150° C. The time required for the reaction is not critical and may be varied between about 1 and 48 hours, depending on the temperature.

The acylates and the carbonyl derivatives can, if desired, be removed by hydrolysis in accordance with methods known in the art, e.g., with dilute acids or bases.

Other derivatives of the oxygenated bioconversion products of the invention can be prepared in accordance with methods known in the art; for example, the compounds which have the radical,

attached to the nitrogen can be reduced using lithium aluminum hydride or diborane to obtain the corresponding aralkyl amines having the partial formula,

>N—CH₂—R

If additional unprotected carbonyl groups are present in the molecule they will be concomitantly reduced to hydroxymethylene, and can be oxidized back to carbonyl, if desired, using chromic acid (Jones reagent) as hereinbefore described. The aralkyl amines thus obtained can be hydrogenolyzed, e.g. using hydrogen in the presence of a catalyst, such as palladium on carbon or Raney nickel to give the corresponding secondary amine, >N—H. The secondary amine, thus obtained can be reacted with chloroacetonitrile in the presence of sodium carbonate to obtain the corresponding cyanomethylamine, which is reduced with lithium aluminum hydried to the corresponding 2-aminoethyl derivative having the partial formulas, >N—CH₂CH₂NH₂. The aminoethyl compound thus obtained is then reacted with 2-methyl-2-thiopseudourea sulfate to obtain the corresponding 2-guanidinoethylamine sulfate having the partial formula:

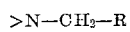

which can be neutralized with alkali to obtain the corresponding free base. The secondary amaines obtained, above can be cycloalkylated at the nitrogen group by reacting with a cycloalkanone followed by reduction with lithium aluminum hydride to obtain the corresponding cycloalkyl amines.

The compounds of the invention wherein the substituent Z or Z₁ is

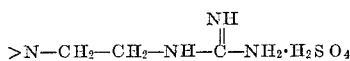

wherein R and R₁ have the meaning previously given, and which have a hydroxy group attached to the heterocyclic ring, can be subjected to acyl migration, e.g. with hydrochloric acid in tetrahydrofuran, which results in acylation of the hydroxy group to obtain the corresponding secondary amine.

The compounds of this invention, wherein the substituent Z or Z₁ is:

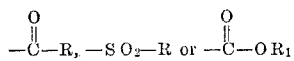

in which R is aryl and R₁ is aralkyl and which have a keto group attached to the reterocyclic ring, can be halogenated on the heterocyclic ring and then subjected to solvolysis with an alcohol in the presence of sodium hydroxide to obtain the corresponding alkyloxy compound. The compounds of this invention having the substituents described above can also be reacted with a Grignard reagent, RMgX, wherein R is alkyl or aryl, as hereinbefore defined and X is halogen, in accordance with known methods to obtain the corresponding compounds wherein the keto substituent is replaced by hydroxy and the R radical of the particular Grignard reagent employed. The acyl substituent on the nitrogen is replaced by hydrogen during the Grignard reaction.

The following preparations and examples are intended to illustrate the process as applied to representative and typical starting materials. The following examples are for the purpose of illustrating the best mode contemplated of carrying out the invention and to supplement the foregoing disclosure of the invention with additional descriptions of the manner and process of carrying out the invention so as further to enable workers skilled in the art to do so.

In addition to the uses given hereinabove, the compounds of this invention which are free amines form salts with fluosilicic acid which are useful as mothproofing agents in accordance with U.S. Pat. 1,915,334 and 2,075,359. These amines also form salts with thiocyanic acid which condense with formaldehyde to form resinous materials useful as pickling inhibitors according to U.S. Pat. 2,425,320 and 2,606,155.

PREPARATION 1

1-benzoylhexamethyleneimine

Benzoyl chloride (60 ml.) in 200 ml. of Skellysolve B was added to a stirred, cooled (ice-bath) solution of 200 ml. of hexamethyleneimine in 800 ml. of Skellysolve B. The mixture was then washed several times with 1 N hydrochloric acid and with water, and filtered through anhydrous sodium sulfate. Evaporation of the Skellysolve B hexanes (hereinafter called Skellysolve B) and distillation of the oily residue gave 40.5 g. of 1-benzoylhexamethyleneimine, B.P. 150–160°/1 torr.

Analysis.—Calcd. for $C_{13}H_{17}NO$ (percent): C, 76.81; H, 8.43; N, 6.89. Found (percent): C, 75.49; H, 8.43; N, 6.54.

PREPARATION 2

1-(p-toluenesulfonyl)-hexamethyleneimine

A mixture of 9.92 g. of hexamethyleneimine, 100 ml. of 2 N sodium hydroxide solution, and 18 g. of p-toluenesulfonyl chloride was shaken vigorously for fifteen minutes (heat of reaction noted) and allowed to stand for two hours. The product was recovered by filtration, washed with water, dried and then recrystallized from aqueous acetone and gave 23.0 g. of 1-(p-toluenesulfonyl)-hexamethyleneimine, M.P. 71–73° C.

Analysis.—Calcd. for $C_{13}H_{19}NO_2S$ (percent): C, 61.62; H, 7.56; S, 12.66. Found (percent): C, 61.83; H, 7.72; S, 12.94.

PREPARATION 3

1-benzoylheptamethyleneimine

A mixture of 30 g. of heptamethyleneimine, 100 ml. of 50% sodium hydroxide solution, and 540 ml. of water was cooled to 15° C. Benzoyl chloride (43 g.) was added dropwise, with vigorous stirring and with the temperature maintained at 15–20° C. Stirring was continued for 1 hour after the end of the addition and the oily product recovered by ether extraction. Evaporation of the ether afforded 55 g. of 1-benzoylheptamethyleneimine as an oil.

PREPARATION 4

1-benzoyloctamethyleneimine

A mixture of 10 g. of octamethyleneimine, 20 ml. of 50% sodium hydroxide and 100 ml. of water, was cooled to about 15° C. and 12.5 g. of benzoyl chloride was added dropwise with vigorous stirring keeping the temperature 15–20° C. Stirring was continued for about 1 hour after the end of the benzoyl chloride addition, and the product was recovered by methylene chloride extraction. Evaporation of the solvent gave 17.6 g. of 1-benzoyloctamethyleneimine as an oil.

PREPARATION 5

1-benzoylalkylpiperidines

Following the procedure of Preparation 4, above, 2-propylpiperidine was converted to 1-benzoyl-2-propylpiperidine; 4 - propylpiperidine to 1 - benzoyl - 4 - propylpiperidine; 2 - methyl - 5 - ethylpiperidine to 1 - benzoyl-2 - methyl - 5 - ethylpiperidine; 2,6 - dimethylpiperidine to 1 - benzoyl - 2,6 - dimethylpiperidine; 2 - methylpiperidine to 1-benzoyl - 2 - methylpiperidine; 3 - methylpiperidine to 1-benzoyl - 3 - methylpiperidine; 4 - methylpiperidine to 1 - benzoyl - 4 - methylpiperidine; 2 - ethylpiperidine to 1 - benzoyl - 2 - ethylpiperidine and 3-methyl - 3 - phenylpiperidine to 1 - benzoyl - 3 - methyl-3-phenylpiperidine.

PREPARATION 6

1-benzoyldodecamethyleneimine

Azacyclotridecane-2-one (40 g. in a Soxhlet thimble) was continuously extracted into a refluxing solution of 15 g. of lithium aluminum hydride in one liter of ether. The reaction was allowed to continue four hours after all of the amide had been added. Water was added to destroy the excess hydride and the ether phase was separated, filtered through sodium sulfate, and concentrated in vacuo to give 36.8 g. of oily dodecamethyleneimine. This was added to 30 ml. of 50% sodium hydroxide in 170 ml. of water, cooled to 20° C. with an ice bath, and 30 g. of benzoyl chloride was added slowly with vigorous stirring. The resultant 1-benzoyldodecamethyleneimine precipitated from solution, was collected on a filter and washed with water. Recrystallization from acetone-Skellysolve B gave 47.5 g. of 1-benzoyldodecamethyleneimine, M.P. 51–53° C.; for analysis a sample was twice recrystallized from acetone-Skellysolve B to M.P. 54–56° C.

Analysis.—Calcd. for $C_{19}H_{29}NO$ (percent): C, 79.39; H, 10.17; N, 4.87. Found (percent): C, 79.43; H, 10.40; N, 5.03.

PREPARATION 7

Benzyl-3-azabicyclo[3.2.2]nonane-3-carboxylate

A suspension of 12.5 g. of 3-azabicyclo[3.2.2]nonane in 115 ml. of 2 N sodium hydroxide was stirred and chilled while adding 17 g. of carbobenzoxy chloride maintaining the temperature between 17–20° C. The mixture was stirred with no temperature control for one hour and then extracted with ether. The extract was washed with dilute hydrochloric acid, water, dilute sodium bicarbonate, water, dried over sodium sulfate, and the solvent removed to give a light yellow oil. The oil thus obtained was chromatographed over 500 g. of Florisil (synthetic magnesium silicate, hereinafter called Florisil) and eluted with Skellysolve B and Skellysolve B containing increasing proportions of acetone (2 to 6% acetone). Those fractions which by thin layer chromatography were found to contain the desired product were combined and evaporated to give 15.80 g. of benzyl-3-azabicyclo[3.2.2]nonane-3-carboxylate as a colorless oil.

Analysis.—Calcd. for $C_{16}H_{21}NO_2$ (percent): C, 74.10; H, 8.16; N, 5.40. Found (percent): C, 74.68; H, 8.22; N 5.49.

PREPARATION 8

3-(p-toluenesulfonyl)-3-azabicyclo[3.2.2]nonane

A suspension of 12.5 g. of 3-azabicyclo[3.2.2]nonane in 100 ml. of 2 N sodium hydroxide was treated with 19.1 g. of p-toluenesulfonyl chloride. The mixture was shaken vigorously. No heat of reaction was noted so the mixture was heated at the boiling point for several minutes, and cooled to room temperature. The lumpy product thus obtained was recovered by filtration, washed with water, and recrystallized from acetone-water; yield 21.0 g. of 3 - (p - toluensulfonyl)-3-azabicyclo[3.2.2]- nonane, M.P. 115–118° C.; an analytical sample from methanol melted at 115–117° C.

*Analysis.*—Calcd. for $C_{15}H_{21}NO_2S$ (percent): C, 64.48; H, 7.58; N, 5.01; S, 11.48. Found (percent): C, 64.20; H, 7.76; N, 5.04; S, 11.53.

PREPARATION 9
3-benzoyl-3-azabicyclo[3.2.2]nonane

To a vigorously stirred mixture of 500 g. of 3-azabicyclo[3.2.2]nonane and 3200 ml. of 10% sodium hydroxide solution was added 500 ml. of benzoyl chloride. After 15 minutes an additional 250 ml. of benzoyl chloride was added and stirring was continued for three hours. The product was recovered, washed with water and dried; yield 900 g. of 3-benzoyl-3-azabicyclo[3.2.2]-nonane, M.P. 92–95° C.; an analytical sample from ether-hexane melted at 93–94° C.

*Analysis.*—Calcd. for $C_{15}H_{19}NO$ (percent): C, 78.56; H, 8.35; N, 6.11. Found (percent): C, 78.79; H, 8.52; N, 6.26.

PREPARATION 10
2-benzoyl-2-azabicyclo[2.2.2]octane

To a stirred mixture of 50 g. of crude 2-azabicyclo-[2.2.2]octane, 100 ml. of 50% sodium hydroxide solution, and 800 ml. of ice plus water was added 50 ml. of benzoyl chloride. Stirring was continued for 1 hour after the addition, and the crude product recovered by filtration and washed with water. The solid product thus obtained was taken up in methylene chloride and filtered through about 100 ml. of Florisil, washed with 1 l. of methylene chloride and then 1 l. of 10% acetone-Skellysolve B. Evaporation and recrystallization from acetone-Skellysolve B gave 2-benzoyl-2-azabicyclo-[2.2.2]octane, 33.8 g., M.P. 100–104° C. For analysis a sample was thrice recrystallized from the same solvent pair to M.P. 115–118° C.

*Analysis.*—Calcd. for $C_{14}H_{17}NO$ (percent): C, 78.10; H, 7.96; N, 6.51. Found (percent): C, 77.85; H, 7.22; N, 6.22.

EXAMPLE 1
Oxygenation of 1-benzoylpiperidine

A medium was prepared of 200 g. of cornsteep liquor (60% solids), 100 g. of commercial dextrose, and 10 l. of tap water. The pH was adjusted to between 4.8 and 5 and 10 ml. of lard oil was added as a foam preventive. This medium was sterilized and inoculated with a 72-hour vegetative growth of *Sporotrichum sulfurescens*, ATCC 7159, and after incubation for 24 hours at a temperature of about 28° C. using a rate of aeration of 0.5 l. per minute and agitation at 300 r.p.m., the substrate, 2 g. of 1-benzoylpiperidine in solution in a minimum amount of acetone (about 20 ml.) was then added to the fermentation. After an additional 72-hour period of incubation at the same temperature and aeration, the beer and mycelium were separated by filtration. The mycelium was washed with water and the wash-water was added to the beer filtrate. The thus obtained beer filtrate was extracted four times with a volume of methylene chloride equal to one-fourth the volume of the filtrate. The combined extracts were washed with one-fourth volume of distilled water and the solvent was removed by distillation to give a residue comprising 1-benzoyl-4-hydroxypiperidine.

Chromatography of the extract residue over Florisil and elution with Skellysolve B containing increasing proportions of acetone gave 407 mg. of crude 1-benzoyl-4-hydroxypiperidine in the late 25% acetone-Skellysolve B eluate fractions. The product was characterized by the following derivatives.

Oxidation of 151 mg. of the crude 4-hydroxy compound with Jones' chromic acid reagent gave 137 mg. of crude 1-benzoyl-4-oxopiperidine which afforded 89 mg. of the 2,4-dinitrophenylhydrazone, M.P. 196–198° C. The remaining crude 4-hydroxy compound was treated with phenyl isocyanate to give, after chromatography on Florisil, 89 mg. of the phenylurethane, M.P. 184.5–186.5° C.

EXAMPLE 2
Oxygenation of 1-benzoylhexamethyleneimine

The bioconversion and extraction procedures of Example 1 were repeated using 2 g. of 1-benzoylhexamethyleneimine as the substrate. The residue thus obtained was chromatographed on Florisil and eluted with Skellysolve B containing increasing proportions of acetone. The 25% acetone-Skellysolve B eluate gave about 250 mg. of 1-benzoyl-4-oxohexamethyleneimine and the acetone eluate gave 1-benzoyl-4-hydroxyhexamethyleneimine, determined by thin layer chromatography.

The 1-benzoyl-4-hydroxyhexamethyleneimine thus obtained was dissolved in acetone and oxidized at room temperature by the addition of a visible excess of Jones' reagent (2.67 M chromic acid reagent prepared from 26.7 g. of chromium trioxide and 23 ml. of sulfuric acid diluted to 100 ml. with water). The excess oxidant was destroyed by the addition of isopropyl alcohol and the mixture was evaporated to dryness. Water (20 ml.) was added, and the product was extracted with 20 ml. of methylene chloride. The extract was evaporated to dryness and the residual 1-benzoyl-4-oxohexamethyleneimine thus obtained was combined with the same product obtained directly from the bioconversion. The combined product was chromatographed on a column of Florisil. The column was eluted with Skellysolve B containing increasing proportions of acetone and those fractions containing the desired product, determined by thin layer chromatography were combined and evaporated to give about 770 mg. of 1-benzoyl-4-oxohexamethyleneimine as an oil, B.P. 170–174°/0.3 torr, that crystallized slowly.

*Analysis.*—Calcd. for $C_{13}H_{15}NO_2$ (percent): C, 71.86; H, 6.96; N, 6.45. Found (percent): C, 71.51; H, 7.25; N, 6.46.

The 2,4-dinitrophenylhydrazone derivative of 1-benzoyl-4-oxohexamethyleneimine melted at 173.5–180° C.

EXAMPLE 3
Oxygenation of 1-benzoylhexamethyleneimine

The bioconversion, oxidation, extraction and chromatographic procedures of Example 1 were repeated on a larger scale using 5000 l. of sterilized medium of the same composition and 1 kg. of 1-benzoylhexamethyleneimine as the substrate to give 96.9 g. of 1-benzoyl-4-oxohexamethyleneimine and 12.57 g. of 1-benzoyl-3-oxohexamethyleneimine. The 3-oxo product was recrystallized three times from ethyl acetate-Skellysolve B hexanes to give 1-benzoyl - 3 - oxohexamethyleneimine, M.P. 113–114° C.; $\nu_{C=O}1705$, 1625, $\nu_{C=C}1600$, 1575, 1495; $\nu_\phi 785$, 750, 705 cm.$^{-1}$ in Nujol.

*Analysis.*—Calcd. for $C_{13}H_{15}NO_2$ (percent): C, 71.86; H, 6.96; N, 6.45. Found (percent): C, 71.48; H, 6.75; N, 6.49.

EXAMPLE 4
Oxygenation of 1-(p-toluenesulfonyl)-hexamethyleneimine

The bioconversion and extraction procedures of Example 1 were repeated using 2 g. of 1-(p-toluenesulfonyl)-hexamethyleneimine as the substrate. The residue from the beer extract thus obtained was chromatographed over 100 g. of Florisil by the gradient elution method. The residue was placed on the Florisil with 75 ml. of methylene chloride; elution was with 4 l. of Skellysolve B containing increasing proportions of acetone from 0–30% and collecting fractions of 105 ml. each. The fractions which contained the desired product, 1-(p-toluenesulfonyl)-4-hydroxyhexamethyleneimine (determined by thin layer chromatography) were combined, evaporated to remove the solvent mixture, redissolved in acetone and oxidized with Jones' reagent in the same manner as disclosed in Example 2, above, to give a crude yellow solid, which was crystallized from ether to give 0.33 g. 1-(p-toluenesulfonyl)-4-oxohexamethyleneimine, M.P. 81° C.

*Analysis.*—Calcd. for $C_{13}H_{17}NO_3S$ (percent): C, 58.40; H, 6.64; N, 5.24; S, 12.00. Found (percent): C, 58.40; H, 6.47; N, 5.26; S, 12.24.

Recrystallization of the 1-(p-toluenesulfonyl)-4-oxohexamethyleneimine thus obtained from acetone-Skellysolve B gave a crystalline modification, M.P. 89–90° C.

EXAMPLE 5

Oxygenation of 1-benzoylheptamethyleneimine

The bioconversion and extraction procedures of Example 1 were repeated using 1-benzoylheptamethyleneimine as the substrate. The extract residue thus obtained, comprising a mixture of 1-benzoyl-4-hydroxyheptamethyleneimine and 1-benzoyl-5-hydroxyheptamethyleneimine, was chromatographed on Florisil. The hydroxylated 1-benzoylheptamethyleneimines were eluted with acetone and oxidized with excess Jones' chromic acid reagent to the corresponding ketoamides, which were separated by chromatography on Florisil and eluted with Skellysolve B containing increasing proportions of acetone. The more polar ketoamide was eluted with 25% acetone-Skellysolve B and recrystallized from acetone-Skellysolve B to give 1-benzoyl-5-oxoheptamethyleneimine, M.P. 122–124° C.

*Analysis.*—Calcd. for $C_{14}H_{17}NO_2$ (percent): C, 72.70; H, 7.41; N, 6.06. Found (percent): C, 72.63; H, 7.59; N, 6.31.

The less polar 1-benzoyl-4-oxoheptamethyleneimine was obtained as an oil from early 25% acetone-Skellysolve B eluate fractions.

EXAMPLE 6

Oxygenation of 1-benzoyldodecamethyleneimine

The bioconversion and extraction procedures of Example 1 were repeated using 1-benzoyldodecamethyleneimine as the substrate. The extract residue thus obtained was analyzed by thin layer chromatography and found to contain a mixture of hydroxy-1-benzoyldodecamethyleneimines, the major components of which were 1-benzoyl-5-hydroxydodecamethyleneimine, 1-benzoyl-6-hydroxydodecamethyleneimine and 1-benzoyl-7-hydroxydodecamethyleneimine. The extract residue was then chromatographed on Florisil and the mixed hydroxy-4-benzoyldodecamethyleneimines were eluted with acetone and oxidized in acetone with excess Jones' reagent in the same manner as disclosed in Example 2, above. The resulting mixture of ketoamides was chromatographed on Florisil. Elution with 25% acetone-Skellysolve B and then, with acetone afforded, successively, 1-benzoyl-5-oxododecamethyleneimine, 1-benzoyl-6-oxododecamethyleneimine, and 1-benzoyl-7-oxododecamethyleneimine.

EXAMPLE 7

Oxygenation of 2-benzoyl-2-azabicyclo[2.2.2]octane

The bioconversion and extraction procedures of Example 1 were repeated using 2 g. of 2-benzoyl-2-azabicyclo[2.2.2]octane as the substrate.

The extract residue thus obtained was chromatographed on Florisil. Elution with 25% acetone-Skellysolve G gave 2-benzoyl-2-azabicyclo[2.2.2]octan-5-ol, which was recrystallized from acetone-Skellysolve B to M.P. 139–141° C.

*Analysis.*—Calcd. for $C_{14}H_{17}NO_2$ (Percent): C, 72.70; H, 7.41; N, 6.06. Found (percent): C, 72.52; H, 7.19; N, 6.18.

The 2-benzoyl-5-hydroxy-2-azabicyclo[2.2.2]octane thus obtained is oxidized with Jones' reagent in the manner disclosed in Example 2, above, to obtain 2-benzoyl-2-azabicyclo[2.2.2]octan-5-one.

EXAMPLE 8

Oxygenation of 3-(p-toluenesulfonyl)-3-azabicyclo[3.2.2]nonane

The biconversion and extraction procedures of Example 1 are repeated using 2 g. of 3-(p-toluenesulfonyl)-3-azabicyclo[3.2.2]nonane as the substrate.

The extract residue thus obtained is chromatographed on a column of Florisil. The column is eluted with Skellysolve B containing increasing proportions of acetone and those fractions which are shown to contain the desired products by thin layer chromatography are combined and evaporated to dryness to give 3-(p-toluenesulfonyl)-3-azabicyclo[3.2.2]nonan-6-one and 3-(p-toluenesulfonyl)-3-azabicyclo[3.2.2]nonan-6-ol.

The 3-(p-toluenesulfonyl)-3-azabicyclo[3.2.2]nonan-6-ol thus obtained is oxidized with Jones' reagent in accordance with the procedure disclosed in Example 2, above, to obtain 3-(p-toluenesulfonyl)-3-azabicyclo[3.2.2]nonan-6-one.

EXAMPLE 9

Oxygenation of bispentamethyleneurea

The biconversion and extraction procedures of Example 1 were repeated using 5 g. of bispentamethyleneurea as the substrate. The extract residue thus obtained was chromatographed on Florisil. Elution with Skellysolve B containing increasing proportions of acetone and acetone gave 1-pentamethylenecarbamyl-4-hydroxypiperidine in the 25% acetone-Skellysolve B eluates and early acetone eluates. These fractions were combined, evaporated to remove the solvent, redissolved in acetone and oxidized with excess Jones' chromic acid reagent. The keto material was chromatographed on Florisil. Elution with 10% acetone-Skellysolve B and later 25% acetone-Skellysolve B afforded the desired 1-pentamethylenecarbamyl-4-oxopiperidine, which was recrystallized from Skellysolve B several times to M.P. 66–67° C.

*Analysis.*—Calcd. for $C_{11}H_{18}N_2O_2$ (percent): C, 62,83; H, 8.63; N, 13.32. Found (percent): C, 62.84; H, 8.36; N, 13.35.

EXAMPLE 10

Oxygenation of 1-benzoyl-2-methyl-5-ethylpiperidine

The bioconversion and extraction procedures of Example 1 were repeated using 2 g. of 1-benzoyl-2-methyl-5-ethylpiperidine as the substrate. The residue thus obtained was chromatographed on a column of Florisil and the column was eluted with Skellysolve B containing increasing portions of acetone. The eluate fractions were analyzed by thin layer chromatography and those containing the desired product were combined and the solvent removed by evaporation to give 1-benzoyl-2-methyl-4-hydroxy-5-ethylpiperidine.

The product thus obtained was oxidized with Jones' reagent in the manner disclosed in Example 2, above, to give 1-benzoyl-2-methyl-4-oxo-5-ethylpiperidine.

EXAMPLE 11

Oxygenation of 3-benzoyl-3-azabicyclo[3.2.2]nonane

A medium was prepared of 2.5 kg. of cornsteep liquor (60% solids), 1 kg. of commercial dextrose, and 125 l. of tap water, and adjusted to a pH between 4.8 and 5. This medium was sterilized, inocuated with a 72-hour vegetative growth of *Sporotrichum sulfurescens*, ATCC 7159, and incubated for 19 hours at a temperature of about 28° C. using a rate of aeration of 6.25 l. per minute at about 300 r.p.m. The substrate, 25 g. of 3-benzoyl-3-azabicyclo[3.2.2]nonane in solution in a minimum amount of acetone (about 250 ml.), was then added to the fermentation and incubation was continued for an additional 72-hour period under the same conditions. Phenolized lard oil (5 g. phenol per liter of lard oil) was added as an antifoam agent as needed, about 50 ml.

was used during the bioconversion. The beer and mycelium were then separated by filtration and the mycelium was washed with water and the wash-water was added to the beer filtrate. The thus obtained beer filtrate was extracted four times with a volume of methylene chloride equal to one-fourth the volume of the filtrate. The combined extracts were washed with one-fourth volume of deionized water and the solvent was removed by distillation at reduced pressure to give 25.8 g. of residue, which was analyzed by thin layer chromatography and gas-liquid (vapor phase) chromatography and found to contain unconverted substrate, 3-benzoyl-3-azabicyclo[3.2.2]nonane-6-one and 3-benzoyl-3-azabicyclo[3.2.2]nonane-6-ol. Gas chromatography showed that the residue contained unchanged substrate, 6-ketone, and 6-hydroxyl in the proportions of 1:4.33:8.33.

The extract residue from the bioconversion (25.8 g.) was dissolved in 50 ml. of acetone and oxidized by the addition of 32 ml. of Jones' reagent over a 5 minute period keeping the temperature of the solution below 30° C. After the addition, the mixture was allowed to stir for ten minutes longer with no temperature control and excess oxidant was then destroyed by the addition of 10 ml. of isopropanol. After adding 1 l. of water and stirring to dissolve sludge, the mixture was extracted three times with 250 ml. of methylene chloride each time. The combined extract was washed once with 250 ml. of water, dried over sodium sulfate, and the solvent removed by distillation, applying reduced pressure at the later stage. The yield of crude residue as an oil was 23.2 g. Gas chromatography and thin layer chromatography showed the oil to be mainly 3-benzoyl-3-azabicyclo[3.2.2]nonan-6-one containing a small amount of unconverted substrate. This material was dissolved in 250 ml. of methylene chloride and percolated through a bed of 175 g. of Florisil, eluting with 500 ml. of methylene chloride followed by 3000 ml. of Skellysolve B containing 18% acetone. The combined eluate was taken to dryness and the residual oil was distilled through a 4 inch Vigreux column at reduced pressure to give 12.17 g. of 3-benzoyl-3-azabicyclo[3.2.2]nonan-6-one, B.P. 190–195 °/0.3 torr.

The following derivatives of 3-benzoyl-3-azabicyclo-[3.2.2]-nonane-6-one were prepared to confirm the structure.

Semicarbazone: M.P. 197–200° C.
Analysis.—Calc'd for $C_{16}H_{20}N_4O_2$ (percent): C, 63.98; H, 6.71; N, 19.65. Found (percent): C, 64.06; H, 6.82; N, 18.29.

Oxime: M.P. 156–158° C.
Analysis.—Calc'd for $C_{15}H_{18}N_2O_2$ (percent): C, 69.74; H, 7.02; N, 10.85. Found (percent): C, 69.71; H, 7.16; N, 10.87.

2,4-dinitrophenylhydrazone: M.P. 198–201° C.
Analysis—Calc'd for $C_{21}H_{21}N_5O_5$ (percent): C, 59.56; H, 5.00; N, 16.54. Found (percent): C, 59.57; H, 4.94; N, 16.65.

EXAMPLE 12

Oxygenation of benzyl-3-azabicyclo[3.2.2]nonane-3-carboxylate

The bioconversion and extraction procedures of Example 11 were repeated using 50 g. of benzyl-3-azabicyclo[3.2.2]nonane-3-carboxylate as the substrate. The beer extract residue thus obtained, containing benzyl-6-hydroxy - 3 - azabicyclo[3.2.2]nonane - 3 - carboxylate, weighed 22.0 g. This was dissolved in 500 ml. of acetone and 50 ml. of Jones' reagent was slowly added while stirring and maintaining the temperature between 25–30° C. during five minutes. The mixture was stirred ten minutes longer at about 28° C. and excess oxidant was destroyed by the addition of 15 ml. of isopropanol. Most of the acetone was removed under reduced pressure, the mixture was diluted with 500 ml. of water and extracted once with 200 ml. and four times with 100 ml. volumes of methylene chloride. The combined extract was washed once with 250 ml. of water, dried over sodium sulfate, and the solvent removed to give 19.1 g. of oil, which was chromatographed over 500 g. of Florisil, placing it on the column with 150 ml. of methylene chloride and eluting by the gradient method with 8.1 of Skellysolve B plus increasing proportions of acetone from 0 to 20% and collecting fractions of about 375 ml. each. The fractions were examined by infrared. Fractions 7–11 contained unchanged substrate. Fractions 14–20 contained a ketone conversion product identified as one component by vapor-phase chromatography. Fractions 14–20 containing the desired product were combined and the solvent removed by distillation at reduced pressure to give 8.93 g. of benzyl-6-oxo-3-azabicyclo[3.2.2]-nonane - 3 - carboxylate as a yellow oil.

Analysis.—Calcd. for $C_{16}H_{19}NO_3$ (percent): C, 70.31; H, 7.01; N, 5.13. Found (percent): C, 70.58; H, 7.41; N, 5.53.

The 2,4-dinitrophenylhydrazone derivative of the benzyl-6-oxo-3-azabicyclo[3.2.2]nonane-3 - carboxylate melted at 84–86° C.

Analysis.—Calcd. for $C_{22}H_{23}N_5O_6$ (percent): C, 58.27; H, 5.11; N, 15.45. Found (percent): C, 58.43; H, 5.21; N, 15.32.

EXAMPLE 13

Oxygenation of 1-benzoyloctamethyleneimine

The bioconversion and extraction procedures of Example 11 were repeated using 15 g. of 1-benzoyloctamethyleneimine as the substrate. The extract residue thus obtained, containing mainly 1-benzoyl-4-hydroxyoctamethyleneimine and 1-benzoyl-5-hydroxy-octamethyleneimine, was taken up in acetone (ca. 1 liter) and oxidized with excess Jones' reagent. The resultant ketoamide mixture was chromatographed on Florisil. The less polar ketoamide, 4-oxo-1-benzoyloctamethyleneimine, was eluted with 25% acetone-Skellysolve B, and the more polar ketoamide, 5-oxo-1-benzoyloctamethyleneimine, was eluted with acetone.

EXAMPLE 14

Oxygenation of 1-benzoyloctamethyleneimine

The bioconversion and extraction procedures of Example 11 were repeated using 25 g. of 1-benzoyloctamethyleneimine as the substrate. The extract residue thus obtained was dissolved in 500 ml. of acetone. The solution was cooled on an ice bath. Excess Jones' reagent was added dropwise to the solution. After 10 minutes, the excess Jones' reagent was decomposed by the addition of isopropyl alcohol. The mixture was concentrated to an oily residue, which was dissolved in 200 ml. of water and 100 ml. of methylene chloride. The aqueous phase was separated and extracted with more methylene chloride (2× 100 ml.). The combined extracts were dried and concentrated. The residual material thus obtained was dissolved in 100 ml. of methylene chloride and the solution was placed on a 2.5 kg. column of Florisil packed in Skellysolve B hexanes. The following two liter fractions were collected: 2 of Skellysolve B, 10 of 10% (v./v.) acetone in Skellysolve B, 8 of 20% acetone in Skellysolve B, 5 of 50% acetone-Skellysolve B, and 3 of acetone. Fractions 15 through 18 gave 4.80 g. of 1-benzoyl-4-oxooctamethyleneimine as a crystalline solid and fractions 20 through 23 gave 11.62 g. of 1-benzoyl-5-oxooctamethylene imine as a crystalline solid. A sample (1.60 g.) of the 1-benzoyl-4-oxooctamethyleneimine was dissolved in methylene chloride and placed on a column of Florisil (80 g.) packed with Skellysolve B. Elution with 10% (v./v.) acetone in Skellysolve B gave colorless crystals. Two recrystallizations from cold methylene chloride-Skellysolve B gave 1-benzoyl-4-oxooctamethyleneimine as colorless plates, M.P. 87–88° C.; $\nu_{C=O}$ 1700 m.s., 1625 s., $\nu_\phi$ 787 m.s., 744 m.s., 705 m.s. cm.$^{-1}$ in Nujol.

*Analysis.*—Calcd. for $C_{15}H_{19}NO_2$ (245.31) (percent): C, 73.44; H, 7.81; N, 5.71. Found (percent): C, 73.30; H, 8.03; N, 5.80.

A sample (11.40 g.) of the 1-benzoyl-5-oxooctamethyleneimine dissolved in methylene chloride was placed on a column of Florisil (600 g.) packed with Skellysolve B. Elution with 25% (v./v.) acetone in Skellysolve B gave colorless crystals, which were recrystallized from acetone-Skellysolve B to M.P. 69–71° C. A final recrystallization from acetone-Skellysolve B gave 1-benzoyl-5-oxo-octamethyleneimine as colorless crystals M.P. 70–72° C.; $\nu_{C=O}$ 1700 m.s., 1625 s., $\nu_\phi$800 m., 748 m.s., 717 s. cm.$^{-1}$ in Nujol.

*Analysis.*—Calcd. for $C_{15}H_{19}NO_2$ (percent): C, 73.44; H, 7.81; N, 5.71. Found (percent): C, 73.54; H, 7.72; N, 5.94.

EXAMPLE 15

Oxygenation of 2-benzoyl-2-azabicyclo[2.2.2]octane

The bioconversion and extraction procedures of Example 11 were repeated using 25 g. of 2-benzoyl-2-azabicyclo [2.2.2]octane as the substrate. The extract residue thus obtained was dissolved in methylene chloride and chromatographed over 1000 g. of Florisil. Elution was with 4 l. each of Skellysolve B hexanes containing 10%, 15%, 20% acetone and 12 l. of Skellysolve B containing 25% acetone; cuts of 800 ml. each were collected; pooled residues as follows:

(A) Fractions 7–11=3.98 g. unchanged substrate
(B) Fractions 17–18=1.61 g. of 2-benzoyl-2-azabicyclo [2.2.2]octan-exo-6-ol
(C) Fraction 19=2.14 g. of mixture
(D) Fractions 20–27=12.16 g. of 2-benzoyl-2-azabicyclo[2.2.2]octan-exo-5-ol.

(B) above was recrystallized from acetone; yield 1.61 g. of 2-benzoyl-2-azabicyclo[2.2.2]octan-exo-6-ol, M.P. 200–205° C.

*Analysis.*—Calcd. for $C_{14}H_{17}NO_2$ (percent): C, 72.70; H, 7.41; N, 6.03. Found (percent): C, 72.70; H, 7.64; N, 5.82.

(D) above was recrystallized from acetone; yield, 10.62 g. of 2-benzoyl-2-azabicyclo[2.2.2]octan-exo-5-ol, M.P. 146–148° C.

*Analysis.*—Calcd. for $C_{14}H_{17}NO_2$ (percent): C, 72.07; H, 7.41; N, 6.03. Found (percent): C, 72.52; H, 7.19; N, 6.03.

EXAMPLE 16

Oxygenation of 3-benzoyl-3-azabicyclo[3.3.1]nonane

The bioconversion and extraction procedures of Example 11 were repeated using 25 g. of 3-benzoyl-3-azabicyclo[3.3.1]nonane as the substrate. The extract residue thus obtained was chromatographed on Florisil (2.0 kg.) packed with Skellysolve B. Elution with 25% and 50% (v./v.) acetone-Skellysolve B gave crystalline material (19.645 g.). Recrystallization from acetone proceeded by decolorization with activated charcoal gave colorless crystals, M.P. 139–141° C. From the several crops collected, a total of 16.894 g. (0.0689 mole, 63%) of 3-benzoyl-3-azabicyclo[3.3.1]nonan-axial-6-ol was obtained, M.P. 137–141° C. Three recrystallizations from acetone gave 3 - benzoyl - 3 - azabicyclo[3.3.1]nonan-axial-6-ol, M.P. 139–141° C.; $[\alpha]_D$ −1° (c., 0.860, chloroform); $\nu_{OH}$ 3460, 3420 sh., $\nu_{C=O, C=C}$ 1610, 1575, 1525, 1495, $\nu_\phi$785, 740, 705 cm.$^{-1}$ in Nujol.

*Analysis.*—Calcd. for $C_{15}H_{19}NO_2$ (percent): C, 73.44; H, 7.81; N, 5.71. Found (percent): C, 73.66; H, 7.96; N, 6.07.

3-benzoyl-3-azabicyclo[3.3.1]nonane was bioconverted in accordance with the procedure described above, using the microorganism *Rhizopus arrhizis*, ATCC 11145 (American type culture collection), to give 3-benzoyl-3-azabicyclo[3.3.1]nonan-1-ol, M.P. 138–140° C.; $[\alpha]_D$ −40° (c., 0.803, chloroform); $\nu_{OH}$ 3330, $\nu_{C=O, C=C}$ 1600, 1575, 1520, 1495, $\nu_\phi$ 725, 705 cm.$^{-1}$ in Nujol.

*Analysis.*—Calcd. for $C_{15}H_{19}NO_2$ (percent): C, 73.44; H, 7.81; N, 5.71. Found (percent): C, 73.46; H, 7.76; N, 6.15, and 3-benzoyl-axial-6-hydroxy-3-azabicyclo[3.3.1] nonane, M.P. 135–137° C., having an infrared spectrum identical with that of the hydroxylated product isolated from bioconversion with *Sporotrichum sulfurescens*, above.

EXAMPLE 17

Oxygenation of 1-benzoyl-2-propylpiperidine

The bioconversion and extraction procedures of Example 11 were repeated using 25 g. of 1-benzoyl-2-propylpiperidine as the substrate. The extract residue thus obtained was dissolved in methylene chloride and chromatographed on Florisil to give 0.524 g. of 1-benzoyl-4-hydroxy-2-propylpiperidine which was recrystallized from acetone-hexanes to M.P. 124–130° C. (0.382 g.)

*Analysis.*—Calcd. for $C_{15}H_{21}NO_2$ (percent): C, 72.84; H, 8.56; N, 5.66. Found (percent): C, 72.64; H, 8.71; N, 5.44, and 0.674 g. of 1-benzoyl-2-(2-hydroxypropyl)piperidine which was recrystallized from acetone-hexanes to M.P. 116–119° C.

*Analysis.*—Calcd. for $C_{15}H_{21}NO_2$ (percent): C, 72.84; H, 8.56; N, 5.66. Found (percent): C, 73.09; H, 8.47; N, 5.59.

A 0.157 g. sample of the 1-benzoyl-4-hydroxy-2-propylpiperidine was dissolved in acetone and oxidized with excess Jones' reagent to give 1-benzoyl-4-oxo-2-propylpiperidine.

A 0.160 g. sample of the 1-benzoyl-2-(2-hydroxypropyl)piperidine was dissolved in acetone and oxidized with excess Jones' reagent to give 1-benzoyl-2-(2-oxopropyl)piperidine.

EXAMPLE 18

Oxygenation of 1-benzoyl-4-propylpiperidine

The bioconversion and extraction procedures of Example 11 were repeated using 25 g. of 1-benzoyl-4-propylpiperidine as the substrate. The extract residue thus obtained was chromatographed on Florisil and eluted with hexanes containing increasing proportions of acetone. The appropriate fractions determined by NMR and IR were combined and distilled to give 1-benzoyl-4-(2-oxopropyl) piperidine, B.P. 168–172° C. (0.15 mm.); $N_D^{26}$ 1.5441.

EXAMPLE 19

Oxygenation of 1-benzoyl-2-methylpiperidine

The bioconversion and extraction procedures of Example 11 were repeated using 25 g. of 1-benzoyl-2-methylpiperidine as the substrate. The extract residue thus obtained was chromatographed on Florisil. The fractions containing the 4-oxo product were combined and recrystallized from acetone-hexanes to give 0.252 g. which was recrystallized again from acetone-hexanes to give 1-benzoyl-4-oxo-2-methylpiperidine, M.P. 117–118° C.

*Analysis.*—Calcd. for $C_{13}H_{15}NO_2$ (percent): C, 71.86; H, 6.96; N, 6.45. Found (percent): C, 72.21; H, 7.07; N, 6.46.

The fractions from the chromatogram which contained the 3-hydroxy product were combined and recrystallized from acetone-hexanes to give 1.225 g. of product which was twice recrystallized from acetone-hexanes to give 1-benzoyl-3-hydroxy-2-methylpiperidine, M.P. 127–129° C.; $[\alpha]_D$ +35°.

*Analysis.*—Calcd. for $C_{13}H_{17}NO_2$ (percent): C, 71.20; H, 7.82; N, 6.39. Found (percent): C, 71.26; H, 8.00; N, 6.68.

The fractions containing the 4-hydroxy product were combined and recrystallized from acetone-hexanes to give 4.277 g. of product which was recrystallized from acetonehexanes to give 1-benzoyl-4-hydroxy-2-methylpiperidine, M.P. 124–125° C.; $[\alpha]_D$ −29°.

*Analysis.*—Calcd. for C₁₃H₁₇NO₂ (percent): C, 71.20; H, 7.82; N, 6.39. Found (percent): C, 71.25; H, 7.83; N, 6.65.

A 0.352 g. sample of the 1-benzoyl-3-hydroxy-2-methylpiperidine in 15 ml. of acetone was oxidized with excess Jones' reagent and concentrated on a steam bath. Water was added and the solution was extracted wtih chloroform (3× 15 ml.). The combined extracts were dried of magnesium sulfate and concentrated under reduced pressure to an oil which was crystallized from methylene chloride-hexanes to give 0.163 g. of 1-benzoyl-3-oxo-2-methylpiperidine, M.P. 102–104° C., which was recrystallized to give colorless plates, M.P. 103–105° C.; [α]_D +74°.

*Analysis.*—Calcd. for C₁₃H₁₅NO₂ (percent): C, 17.86; H, 6.96; N, 6.45. Found (percent): C, 71.99; H, 7.09; N, 6.25.

A 0.5 g. sample of 1-benzoyl-4-hydroxy-2-methylpiperidine was dissolved in 25 ml. of acetone, oxidized and worked up in the manner described above to give 0.325 g. of 1-benzoyl-4-oxo-2-methylpiperidine, M.P. 116–119° C. The infrared spectrum was identical to the same material obtained directly from the bioconversion, above.

EXAMPLE 20

Oxygenation of 1-benzoyl-4-methylpiperidine

The bioconversion and extraction procedures of Example 11 were repeated using 25 g. of 1-benzoyl-4-methylpiperidine as the substrate. The extract residue thus obtained was chromatographed on Florisil. The fractions containing the 4-hydroxy product were combined and recrystallized from acetone-hexanes to give 1.342 g. which was recrystallized twice again from acetone-hexanes to give 1-benzoyl-4-hydroxy-4-methylpiperidine, M.P. 104–106° C.

*Analysis.*—Calcd. for C₁₃H₁₅NO₂ (percent): C, 71.20; H, 7.82; N, 6.39. Found (percent): C, 71.24; H, 7.77; N, 6.53.

The fractions from the chromatogram which contained the hydroxy methyl product were combined and recrystallized from acetone-hexanes to give 4.721 g. of product which was twice recrystallized from acetone-hexanes to give 1-benzoyl-4-hydroxymethylpiperidine, M.P. 92–95° C.

*Analysis.*—Calcd. for C₁₃H₁₇NO₂ (percent): C, 71.20; H, 7.82; N, 6.39. Found (percent): C, 71.37; H, 7.94; N, 6.43.

EXAMPLE 21

3-benzoyl-3-azabicyclo[3.3.1]nonan-6-one

A solution of 3-benzoyl-3-azabicyclo[3.3.1]nonan-axial-6-ol (1.543 g., 0.00630 mole) in acetone (150 ml.) was cooled on an ice bath and treated with an excess (1.8 ml.) of Jones' reagent. After 30 minutes at room temperature, the excess oxidant was consumed with isopropyl alcohol. The solution was decanted and filtered through sodium sulfate. The residue was dissolved in water and extracted with methylene chloride. The combined organic solutions were dried over magnesium sulfate, Celite was added, and the mixture again filtered. The filtrate was concentrated under reduced pressure and cooled. Crystallization gave 0.882 g. (0.00363 mole, 57%) of product, M.P. 158–160° C. Two recrystallizations from acetone gave colorless crystals of 3-benzoyl-3-azabicyclo [3.3.1]nonan-6-one, M.P. 159–161° C.; $\nu_{C=O}$ 1705, 1620, $\nu_{C=C}$ 1600, 1580, 1570, 1490, $\nu_\phi$ 785, 775, 735, 700 cm.⁻¹ in Nujol.

*Analysis.*—Calcd. for C₁₅H₁₇NO₂ (percent): C, 74.05; H, 7.04; N, 5.76. Found (percent): C, 73.16; H, 7.30; N, 5.29.

EXAMPLE 22

2-benzoyl-2-azabicyclo[2.2.2]octan-5-one

Two grams of 2-benzoyl-2-azabicyclo[2.2.2]octan-5-ol dissolved in 100 ml. of acetone was treated dropwise with a slight excess of a stock solution of oxidizing reagent prepared from 26.7 g. of chromium trioxide, 50 ml. of water, and 23 ml. of concentrated sulfuric acid (Jones' reagent). An ice bath was applied as necessary to keep the temperature below 30° during the oxidation. Isopropanol (5.0 ml.) was added to destroy excess chromic acid. The mixture was diluted with 200 ml. of water and extracted with methylene chloride. The extract was washed once with water and dried over sodium sulfate. The solvent was removed by distillation and resulting product crystallized to yield 1.95 g. of 2-benzoyl-2-azabicyclo[2.2.2]octan-5-one, M.P. 66–72° C.; IR (CHCl₃ solution), 1740 cm.⁻¹ (C=O).

EXAMPLE 23

2-benzoyl-2-azabicyclo[2.2.2]octan-6-one

A mixture of 300 mg. of 2-benzoyl-2-azabicyclo[2.2.2]octan-6-ol (300 mg.) in 20 ml. of acetone was oxidized with chromic acid in the manner described in Example 22, above. The product thus obtained was recrystallized from acetone-hexane to give 2-benzoyl-2-azabicyclo [2.2.2]octan-6-one, M.P. 99–101° C.; IR (CHCl₃ solution), 1740 cm.⁻¹ (C=O).

EXAMPLE 24

1-benzoyl-5-hydroxyheptamethyleneimine

A solution of 700 mg. of 1-benzoyl-5-oxoheptamethyleneimine (from Example 5, above) in 12 ml. of methanol was reduced with a solution of 150 mg. of sodium borohydride in 2 ml. of N/10 sodium hydroxide at room temperature overnight. The product was recovered by acidification with acetic acid, evaporation of most of the methanol at reduced pressure, and partition between water and methylene chloride. Chromatography of the organic solution on Florisil gave 657 mg. of 1-benzoyl-5-hydroxyheptamethyleneimine in the acetone eluate; for analysis the material was recrystallized from acetone-Skellysolve B to M.P. 116–118° C.

*Analysis.*—Calcd. for C₁₄H₁₉NO₂ (percent): C, 72.07; H, 8.21; N, 6.00. Found (percent): C, 72.18; H, 8.01; N, 6.03.

In the same manner following the procedure of Example 23, other keto compounds of this invention can likewise be reduced to the corresponding hydroxy compounds by substituting the appropriate keto compound as starting material in place of 1-benzoyl-5-oxoheptamethyleneimine. The following conversions are representative:

1-benzoyl-4-oxoheptamethyleneimine to 1-benzoyl-4-hydroxyheptamethyleneimine;

1 - (p-toluenesulfonyl)-4-oxohexamethyleneimine to 1-(p-toluenesulfonyl)-4-hydroxyhexamethyleneimine;

1 - benzoyl-5-oxododecamethyleneimine to 1-benzoyl-5-hydroxydodecamethyleneimine;

1 - benzoyl-6-oxododecamethyleneimine to 1-benzoyl-6-hydroxydodecamethyleneimine;

1 - benzoyl-7-oxododecamethyleneimine to 1-benzoyl-7-hydroxydodecamethyleneimine;

1 - benzoyl - 4-oxoöctamethyleneimine to 1-benzoyl-4-hydroxyoctamethyleneimine;

1 - benzoyl - 5-oxoöctamethyleneimine to 1-benzoyl-5-hydroxyoctamethyleneimine;

3 - (p - toluenesulfonyl) - 3-azabicyclo[3.2.2]nonan-6-one to 3-(p-toluenesulfonyl)-3-azabicyclo[3.2.2]nonan-6-ol; and the like.

EXAMPLE 25

3-benzoyl-3-azabicyclo[3.3.1]nonan-equatorial-6-ol

A solution of sodium borohydride (1.0 g., 0.0265 mole) in 10 ml. of 0.1 M aqueous sodium hydroxide was added to a solution of 3-benzoyl-3-azabicyclo[3.3.1]nonan-6-one (1.017 g., 4.18 mmoles) in 40 ml. of methanol. Thin layer chromatography after 0.5 hour showed the reaction to be complete. The solution was partially concentrated under reduced pressure and then was diluted with 150 ml. with water. The solution was made acidic (pH 5-6) with acetic acid and was concentrated under reduced pressure over a hot water bath until crystals began to form. The mixture was extracted with methylene chloride (3× 50 ml.). From the dried (magnesium sulfate) extract solution, an oil was obtained following concentration. The oil crystallized and the solid was recrystallized from acetone-Skellysolve B, giving 0.695 g. (2.84 mmoles, 67%) of 3-benzoyl-3-azabicyclo[3.3.1]nonan-equatorial-6-ol, M.P. 135–138° C., which was recrystallized twice from acetone-skellysolve B to M.P. 139–141° C.; $\nu_{OH}$ 3360, $\nu_{C=O}$ 1600, $\nu_{C=C}$ 1590, 1575, 1530, 1490, $\nu_{C=O}$ 1060, $\nu_\phi$ 790, 780, 735 705 cm.$^{-1}$ in Nujol.

Analysis.—Calcd. for $C_{15}H_{19}NO_2$ (percent): C, 73.44; H, 7.81; N, 5.71. Found (percent): C, 73.92; H, 7.95; N, 6.08.

EXAMPLE 26

3-benzoyl-3-azabicyclo[3.2.2]nonan-exo-6-ol

Twenty grams of the crude 3-benzoyl-3-azabicyclo[3.2.2]nonan-exo-6-one dissolved in 350 ml. of methanol was treated with a solution of 16.0 g. of sodium borohydride in 100 ml. of N/10 sodium hydroxide for 30 minutes. Thin layer chromatography indicated complete reaction. The mixture was diluted with 300 ml. of water and allowed to stand for 18 hours with chilling. The mixture was then adjusted to pH 6 by the cautious addition of 50% acetic acid. The solid product thus obtained was recovered by filtration, washed with water and dried; yield, 12.75 g. of 3-benzoyl-3-azabicyclo[3.2.2]nonan-exo-6-ol, M.P. 131–135° C.; an analytical sample from acetone melted at 135–137° C.

Analysis.—Calcd. for $C_{15}H_{19}NO_2$ (percent): C, 73.44; H, 7.81; N, 5.71. Found (percent): C, 73.31; H, 7.87; N, 5.89.

EXAMPLE 27

3-azabicyclo[3.2.2]nonan-exo-6-ol 6-benzoate hydrochloride (acyl migration)

To a warm solution of 3-benzoyl-3-azabicyclo[3.2.2]nonan-exo-6-ol (2.14 g.) in 50 ml. of tetrahydrofuran was added 4.0 ml. of concentrated hydrochloric acid and the mixture was allowed to stand at 25° C. The solution was examined at intervals by thin layer chromatography and after complete reaction (23 hours), it was concentrated under reduced pressure. The oil thus obtained was triturated twice with ether, decanting off the ether each time, and the HCl salt was precipitated by adding 25 ml. of acetone and 50 ml. of ether; yield, 2.16 g., M.P. 205–208° C. This was recrystallized from methanol-methyl ethyl ketone; yield 2.06 g. of 3-azabicyclo[3.2.2]nonan-exo-6-ol 6-benzoate hydrochloride, M.P. 205–208° C.; IR amine, HCl at 2250–2700 cm.$^{-1}$; ester C=O at 1710 cm.$^{-1}$.

Analysis.—Calcd. for $C_{15}H_{20}NO_2Cl$ (percent): C, 63.93; H, 7.15; N, 4.97. Found (percent) C, 63.92; H, 7.44; N, 5.24.

EXAMPLE 28

3-benzoyl-3-azabicyclo[3.3.1.]nonan-6-one ethylene ketal

A mixture of 3-benzoyl-3-azabicyclo[3.3.1]nonan-6-one (0.550 g., 0.00226 mole) in benzene (100 ml.), p-toluenesulfonic acid hydrate (0.090 g., 0.000473 mole), and ethylene glycol (10 ml.) was heated to reflux for 18 hours. The condensate was dried by passing through a calcium carbide trap. A few drops of pyridine were added and the mixture was cooled to room temperature. The mixture was extracted with 5% aqueous sodium bicarbonate solution (50 ml.) and with water (2×25 ml.). The benzene layer was dried over magnesium sulfate and concentrated under reduced pressure to give as 3-benzoyl-3-azabicyclo[3.3.1]-nonan-6-one ethylene ketal as an oil, $\nu_{C=O}$ 1630, $\nu_{C=C}$ 1605, 1580, 1500, $\nu_\phi$ 708 cm.$^{-1}$.

EXAMPLE 29

8-benzoyl-1,4-dioxa-8-azaspiro[4.7]dodecane

A mixture of 1-benzoyl-4-oxoheptametheneimine (16.487 g., 0.0712 mole), p-toluenesulfonic acid hydrate (1.35 g., 0.00710 mole), ethylene glycol (25 ml.), and benzene (200 ml.) was heated to reflux for 24 hours. The condensate was passed through a calcium carbide drying trap during this time. Pyridine (2.0 ml.) was added and the mixture was cooled. The mixture was extracted with aqueous sodium bicarbonate solution and with water (3× 100 ml.). The benzene layer was dried over magnesium sulfate and concentrated to give 8-benzoyl-1,4-dioxa-8-azasporo[4.7]dodecane as a viscous oil.

EXAMPLE 30

9-benzoyl-1,4-dioxa-9-azaspiro[4.7]dodecane

A mixture of 1-benzoyl-5-heptamethyleneimine (39.883 g., 0.172 mole), p-toluenesulfonic acid (2.96 g., 0.0155 mole), ethylene glycol (75 ml., 83 g., 1.34 mole), and benzene (500 ml.) was heated to reflux. The condensate was dried by passing it through a calcium carbide trap. The mixture was refluxed 30 hours. Pyridine (6.0 ml.) was then added to the cooled mixture, the benzene layer was extracted with 5% aqueous sodium bicarbonate (3× 100 ml.) and dried over magnesium sulfate. Concentration of the benzene solution gave 42.95 g. (0.156 mole, 90% yield) of a viscous oil which was crystallized from ether to give 9-benzoyl-1,4-dioxa-9-azaspiro[4.7]dodecane, M.P. 72–74° C. Two recrystallizations from ether-Skellysolve B gave colorless crystals of 9-benzoyl-1,4-dioxa-9-azaspiro[4.7]dodecane, M.P. 72–73° C.; $\nu_{C=O}$ 1630 s. cm.$^{-1}$ in Nujol.

Analysis.—Calcd. for $C_{16}H_{21}NO_3$ (275.34) (percent): C, 69.79; H, 7.69; N, 5.09. Found (percent): C, 69.99; H, 7.84; N, 5.20.

EXAMPLE 31

9-benzoyl-1,4-dioxa-9-azaspiro[4.8]tridecane

A solution of 1 - benzoyl-5-oxooctamethyleneimine (18.819 g., 0.0768 mole) and p-toluenesulfonic acid hydrate (1.46 g.) in benzene (200 ml.) with ethylene glycol (30 ml.) was heated to the reflux temperature of benzene for 22 hours and the condensate was passed through a calcium carbide drying trap. Pyridine (3.0 ml.) was added at the end of the reflux period, the mixture was cooled and then extracted with 5% aqueous sodium bicarbonate (100 ml.) and with water (2× 100 ml.). The benzene layer was dried over magnesium sulfate, and concentrated under reduced pressure, giving a viscous yellow oil. The infrared spectrum of the oil showed the presence of a carbonyl function (1730 w. cm.$^{-1}$) and so the oil was resubjected twice to the ketalization process. The crude oily product crystallized spontaneously on standing. Recrystallization from ether-Skellysolve B gave two crops (13.682 g., 0.0473 mole, 61%) of light yellow crystals, M.P. 90–95° C., which were recrystallized from ether-Skellysolve B to give 9-benzoyl-1,4-dioxa-9-azaspiro[4.8]tridecane, M.P. 98–100° C. A final recrystallization preceded by decolorization with activated charcoal gave colorless needles of 9-benzoyl-1,4-dioxa-9-azaspiro[4.8]tridecane, M.P. 99–101° C.; $\nu_{C=O}$ 1630 s.; $\nu_\phi$ 798 m., 737 m., 704 m.s. cm.$^{-1}$ in Nujol.

Analysis.—Calcd. for $C_{17}H_{23}NO_3$ (289.36) (percent): C, 70.56; H, 8.01; N, 4.84. Found (percent): C, 70.50; H, 8.08; N, 5.16.

EXAMPLE 32

8-benzoyl-1,4-dioxa-8-azaspiro[4.6]undecane

A mixture of 11.957 g. (0.0551 mole) 1-benzoyl-4-oxohexamethyleneimine in 200 ml. of benzene, 1.020 g. (0.00537 mole) of p-toluenesulfonic acid hydrate and 28 ml. of ethylene glycol was stirred and heated at reflux for about 24 hours. The condensate was passed through a calcium carbide trap to remove water. Pyridine (3 ml.)

was added at the end of the reflux period and the mixture cooled. The mixture was extracted with 5% aqueous benzene layer was dried and concentrated under reduced pressure to give 8 - benzoyl-1,4-dioxa-8-azaspiro[4.6]undecane as an oil, $\nu_{C=O}$ 1630 cm.$^{-1}$.

EXAMPLE 33

8-benzyl-1,4-dioxa-8-azaspiro[4.6]undecane

The product from Example 32 above, was dissolved in 75 ml. of ether and added dropwise to a mixture of lithium aluminum hydride (2.0 g.) and ether (200 ml.). The mixture was stirred and heated to reflux for 3 hours, stirred at room temperature for about 72 hours, and again heated to reflux for 2 hours before the excess lithium aluminum hydride was decomposed by the addition of ethyl acetate and water. The solids thus obtained were removed by filtration and were washed with ether. The filtrate and washes were combined, dried and concentrated to an oil which was distilled to give 9.696 g. (0.0392 mole), 71% of 8-benzyl-1,4-dioxa-8-azaspiro[4.6]undecane as a pale yellow oil, B.P. 120–121° C. (0.13 mm.); $n_D^{25}$ 1.5312; $\nu_{C=C}$ 1600, 1580, 1490, $\nu_\theta$ 730,695 cm.$^{-1}$.

*Analysis.*—Calcd. for $C_{15}H_{21}NO_2$ (247.33) (percent): C, 72.84; H, 8.56; N, 5.66. Found (percent): C, 73.22; H, 8.98; N, 6.11.

EXAMPLE 34

9-benzyl-1,4-dioxa-9-azaspiro[4.7]dodecane

A solution of 9-benzoyl-1,4-dioxa-9-azaspiro[4.7]dodecane (40.9 g., 0.148 mole) in ether (300 ml.) was added slowly to a stirred mixture of lithium aluminum hydride (6.0 g., 0.158 mole) and ether (200 ml.). The resulting mixture was stirred at room temperature for 16 hours and at reflux temperature for 5 hours. The excess lithium aluminum hydride was decomposed with 1:1 acetone-water and with water. The inorganic solids were collected on a filter and washed three times with ether. The combined ether solution was dried and concentrated to an oil (38.26 g.). Simple distillation gave 9-benzyl-1,4-dioxa-9-azaspiro[4.7]dodecane as a colorless oil (33.72 g., 0.129 mole, 87% yield), B.P. 125–127° C. (0.3 mm.); $\nu_{C-O}$ 1115 s. cm.$^{-1}$.

*Analysis.*—Calcd. for $C_{16}H_{23}NO_2$ (261.35) (percent): C, 73.53; H, 8.87; N, 5.36. Found (percent): C, 73.39; H, 8.31; N, 5.34.

EXAMPLE 35

8-benzyl-1,4-dioxa-8-azaspiro[4.7]dodecane

The 8-benzoyl-1,4-dioxa-8-azaspiro[4.7]dodecane from Example 30, above, was dissolved in ether (2 l.) and slowly added to a stirred mixture of lithium aluminum hydride (3.0 g., 0.0790 mole) and ether (200 ml.). The excess ether was allowed to boil off. The remaining oil was dissolved in tetrahydrofuran and added to the reaction mixture. The mixture was stirred and refluxed 7 hours and then kept at room temperature overnight. The excess lithium aluminum hydride was destroyed by addition of ethyl acetate and water. The inorganic solids were removed by filtration and were washed with ether. The combined ether filtrates were combined, dried, and concentrated to a yellow oil. Distillation of the oil gave 8 - benzyl-1,4-dioxa-8-azaspiro[4.7]dodecane (5.700 g., 0.0218 mole, 30% yield) as colorless oil, B.P. 140–150° C. (0.2 mm.); $n_D^{26}$ 1.5284; $\nu_{C=C}$ 1600 m.w., 1580 w., 1490 s., $\nu_\theta$ 725 s., 695 s. cm.$^{-1}$.

*Analysis.*—Calcd. for $C_{16}H_{23}NO_2$ (261.35) (percent): C, 73.53; H, 8.87; N, 5.36. Found (percent): C, 73.33; H, 8.91; N, 5.14.

EXAMPLE 36

9-benzyl-1,4-dioxa-9-azaspiro[4.8]tridecane

A solution of 9 - benzoyl-1,4-dioxa-9-azaspiro[4.8]tridecane (13.331 g., 0.0462 mole) in ether (250 ml.) was dribbled into a mixture of lithium aluminum hydride (2.0 g.) in ether (100 ml.). The mixture was stirred at room temperature for 16 hours and at reflux temperature for 4 hours. The excess hydride was decomposed by the cautious addition of water. The inorganic solids were removed by filtration and washed with ether. The combined ether solution was dried and concentrated to an oil. A simple distillation of the oil gave 9-benzyl-1,4-dioxa-9-azaspiro[4.8]tridecane (10.779 g., 0.0392 mole, 85% yield) as a colorless oil, B.P. 145–147° C. (1.5 mm.); $n_D^{26}$ 1.5302; $\nu_{C=C}$ 1600 w., 1498 m., $\nu_\phi$ 750 m., 715 m.s., 701 m.s. cm.$^{-1}$.

*Analysis.*—Calcd. for $C_{17}H_{25}NO_2$ (275.38) (percent): C, 74.14; H, 9.15; N, 5.09. Found (percent): C, 74.77; H, 9.66; N, 5.04.

The product crystallized when kept overnight in the refrigerator, M.P. 44–46° C.

EXAMPLE 37

3-benzyl-3-azabicyclo[3.3.1]nonan-6-one ethylene ketal

A solution of the 3-benzoyl-3-azabicyclo[3.3.1]nonan-6-one ethylene ketal from Example 29, above, in ether was reduced with lithium aluminum hydride (0.5 g.) in ether. After refluxing 4 hours, the excess hydride was decomposed with ethyl acetate and water, the solids were filtered off, the ether solution was dried over magnesium sulfate and concentrated to give 3-benzyl-3-azabicyclo[3.3.1]nonan-6-one ethylene ketal as an oil; $\nu_{CH}$ 2930, 2900, 2875, $\nu_{C=C}$ 1600, 1580, 1495, $\nu_\phi$ 736, 700 cm.$^{-1}$.

EXAMPLE 38

3-benzyl-3-azabicyclo[3.3.1]nonan-1-ol

A suspension of 3-benzoyl-1-hydroxy-3-azabicyclo[3.3.1]nonane (0.478 g., 0.00195 mole) in ether was added to a mixture of lithium aluminum hydride (0.6 g.) and ether. The resulting mixture was stirred at room temperature overnight and then heated to reflux temperature for 7 hours. The excess hydride was decomposed by addition of ethyl acetate and water. The solids were removed by filtration through celite and the ether solution was dried (magnesium sulfate). An oil was obtained upon removal of the ether. The oil crystallized in the cold and crystals formed from a cold pentane solution and were collected giving 0.206 g. (0.00892 mole, 45%) of crystals. M.P. 74—76° C. Recrystallization, preceded by decolorization with activated charcoal gave colorless crystals of 3-benzyl-3-azabicyclo[3.3.1]nonan-1-ol, M.P. 73–76° C.; $[\alpha]_D$ —24° (c., 0.740, CHCl$_3$); $\nu_{OH}$ 3280, 3210, $\nu_{C=C}$ 1600, 1585, 1495, $\nu_\phi$ 760, 745, 710, 700 cm.$^{-1}$ in Nujol; NMR confirmed the structure.

*Analysis.*—Calcd. for $C_{15}H_{21}NO$ (percent): C, 77.88; H, 9.15; N, 6.05. Found (percent): C, 77.84; H, 9.45; N, 6.13.

EXAMPLE 39

3-benzyl-3-azabicyclo[3.2.2]nonan-endo-6-ol hydrochloride

The 3 - benzoyl - 3 - azabicyclo[3.2.2]nonan-endo-6-ol (6.69 g.) was dissolved in 80 ml. of tetrahydrofuran and added with stirring to a mixture of 6.0 g. of lithium aluminum hydride in 100 ml. of ether. The mixture was refluxed for one hour, chilled in a cold bath, and carefully decomposed by the addition of 25 ml. of water. After dilution with 300 ml. of ether and filtering, the filtrate and ether wash was dried (MgSO$_4$) and the solvent removed under reduced pressure to give 5.90 g. of 3-benzyl-3-azabicyclo[3.2.2]nonan-endo-6-ol as a straw colored oil. Part of the oil (1.33 g.) was dissolved in ether and treated with ethereal hydrogen chloride to precipitate the salt which was recrystallized from methanol ether to give 1.07 g. of 3-benzyl-3-azabicyclo[3.2.2]nonan-endo-6-ol hydrochloride, M.P. 185–187° C.

*Analysis.*—Calcd. for $C_{15}H_{22}NOCl$ (percent): N, 5.23; Cl, 13.24. Found (percent): N, 5.47; Cl, 13.74.

EXAMPLE 40

3-benzyl-3-azabicyclo[3.3.1]nonan-axial-6-ol

A solution of 3-benzoyl-3-azabicyclo[3.3.1]nonan-axial-6-ol (5.0 g., 0.204 mole) in tetrahydrofuran (100 ml.) was poured into a mixture of lithium aluminum hydride (3.0 g.) and tetrahydrofuran (150 ml.). The whole mixture was heated at reflux temperature for five hours then the excess hydride was consumed with ethyl acetate and water. The inorganic solids were removed by filtration and washed with hot tetrahydrofuran. The tetrahydrofuran solution was dried over magnesium sulfate and concentrated under reduced pressure to an oil. The oil was transferred with ether to a distillation flask. After a few minutes at low pressure, the oil solidified. The solid crystallized from cold hexane, giving crystals, M.P. 67–69° C. Three recrystallizations from cold hexane, the last preceded by decolorization with activated charcoal, resulted in colorless crystals of 3-benzyl-3-azabicyclo[3.3.1]nonan-axial-6-ol, M.P. 70–71° C.; $\nu_{OH}$ 3320, 3220, $\nu_{C=C}$ 1600, 1495, $\nu_\phi$ 730, 695 cm.$^{-1}$ on the oil.

Analysis.—Calcd. for $C_{15}H_{21}NO$ (percent): C, 77.88; H, 9.15; N, 6.05. Found (percent): C, 78.01; H, 9.54; N, 6.33.

EXAMPLE 41

3-benzyl-3-azabicyclo[3.2.2]nonan-6-one hydrochloride

The 3-benzoyl-3-azabicyclo[3.2.2]nonan-6-one (5.13 g.), 60 ml. of benzene, 8 ml. of pyrrolidine, and 100 mg. of p-toluenesulfonic acid was heated at reflux under a water trap for two hours. The mixture was concentrated under reduced pressure to a dark oil. A solution of the crude enamine in 50 ml. of ether, and 25 ml. of tetrahydrofuran was added to a stirred mixture of 3.0 g. of lithium aluminum hydride and 100 ml. of ether. After stirring at reflux for one hour the mixture was chilled and cautiously treated with 15.0 ml. of water, diluted with ether, and filtered. The filtrate was dried (MgSO$_4$) and concentrated to yield a light yellow oil. Infrared indicated that the enamine protective moiety has been replaced by carbonyl. The oil thus obtained was dissolved in ether and treated with ethereal HCl to precipitate 3-benzyl-3-azabicyclo[3.2.2]nonan-6-one hydrochloride.

Analysis.—Calcd. for $C_{15}H_{19}NO \cdot HCl$ (percent): N, 5.27; Cl. 13.34. Found (percent): N, 5.57; Cl, 13.55.

EXAMPLE 42

3-benzyl-3-azabicyclo[3.2.2]nonan-4-ol

The crude 3-benzyl-3-azabicyclo[3.2.2]nonan-4-ol resulting from the hydride reduction of 10 g. of 4-hydroxy-3-benzoyl-3-azabicyclo[3.2.2]nonane, dissolved in 600 ml. of toluene and 150 ml. of cyclohexanone was distilled to remove ca. 100 ml. of toluene. Aluminum isopropoxide (20 g.) was added, the mixture was distilled to remove ca. 50 ml. of solvent and then heated at reflux for 60 minutes. After cooling it was poured onto an ice mixture containing excess hydrochloric acid, stirred, and the layers were separated. The aqueous acid layer was extracted several times with ether and then made basic with 50% sodium hydroxide solution. The resulting emulsion was well extracted with ether and the ether extract was washed once with water and dried over magnesium sulfate. The ether solution was made up to 650 ml. and 100 ml. of this was treated with ethereal HCl to precipitate the salt, which was recrystallized from methanol-ether to give 0.744 g. of 3-benzyl-3-azabicyclo[3.2.2]nonan-6-one hydrochloride.

Analysis.—Calcd. for $C_{15}H_{19}NO \cdot HCl$ (percent): C, 67.78; H, 7.59; N, 5.27; Cl, 13.34. Found (percent): C, 68.13; H, 7.77; N, 5.42; Cl, 13.17.

EXAMPLE 43

3-benzyl-3-azabicyclo[3.3.1]nonan-6-one

A solution of 3-benzyl-3-azabicyclo[3.3.1]nonan-6-ol obtained by lithium aluminum hydride reduction of 7.457 g. of 3-benzoyl-3-azabicyclo[3.3.1]nonan-6-one in toluene (120 ml.) and cyclohexane (30 ml.) was heated to boiling and the toluene-water azeotrope distilled off. Aluminum i-propoxide (10 g.) and cyclohexanone (10 ml.) were added to the solution and the mixture was heated at reflux temperature for two hours. The mixture was poured into ice-aqueous hydrochloric acid and stirred. The aqueous layer was separated, extracted with ether (3 × 100 ml.), and made alkaline with concentrated sodium hydroxide solution. A heavy precipitate formed at the neutralization point but disappeared and an oil formed as additional base was added. The solution and oily phase were extracted (3 × 100 ml.) with ether; the ether was dried over magnesium sulfate and concentrated under reduced pressure to a reddish-brown oil. The oil was transferred with ether to a 10 ml. distillation flask and distilled, B.P. 126–129° C. (0.04 mm.), giving 4.171 g. (0.0182 mole, 60% yield) of 3-benzyl-3-azabicyclo[3.3.1]nonan-6-one of colorless oil, $n_D$ 1.5499; $\nu_{C=O}$ 1700, $\nu_{C=C}$ 1600, 1580, 1490, $\nu_\phi$ 735, 695 cm.$^{-1}$ on the oil.

Analysis.—Calcd. for $C_{15}H_{19}NO$ (percent): C, 78.56; H, 8.35; N, 6.11. Found (percent): C, 78.90; H, 8.56; N, 6.05.

EXAMPLE 44

3-benzyl-3-azabicyclo[3.3.1]nonan-6-one perchlorate

From 3-benzyl-3-azabicyclo[3.3.1]nonan-6-one ethylene ketal.—Aqueous perchloric acid (70%, 15 drops) was added to a solution of 3-benzyl-3-azabicyclo[3.3.1]nonan-6-one ethylene ketal (0.25 g., 0.000915 mole) in absolute ethanol (5.0 ml.). The solution was heated on the steam bath for three minutes. Addition of ether slowly precipitated an oily solid, which crystallized into colorless crystals (0.251 g., 0.000763 mole, 83%), M.P. 210–215° C. Two recrystallizations from ethanol containing a few drops of water gave crystals of 3-benzyl-3-azabicyclo[3.3.1]nonan-6-one perchlorate, M.P. 213–216° C.; $\nu_{NH}$ +3080, $\nu_{C=O}$ 1695, $\nu_{C=C}$ 1500, $\nu_\phi$ 770, 745, 705 cm.$^{-1}$ in Nujol.

Analysis.—Calcd. for $C_{15}H_{20}NO_5Cl$ (percent): C, 54.63; H, 6.11; N, 4.25. Found (percent): C, 54.51; H, 5.87; N, 4.33.

From 3-benzyl - 3 - azabicyclo[3.3.1]nonan-6-one.—Aqueous perchloric acid (70%, 10 drops) was added to a solution of 3-benzyl - 3 - azabicyclo[3.3.1]nonan-6-one (0.236 g., 0.00103 mole) in absolute ethanol (3 ml.). Crystals formed after 10 minutes. A first crop of 0.157 g. of colorless crystals was collected by filtration. A second crop of 0.042 g. (0.199 g. total, 0.000605 mole, 58%) was obtained from the mother liquor. The infrared spectrum of the crystals of 3-benzyl - 3-azabicyclo-[3.3.1]-nonan-6-one perchlorate thus obtained was identical to that of the above salt.

EXAMPLE 45

3-benzoyl-7-bromo-3-azabicyclo[3.3.1]nonan-6-one

A solution of bromine in chloroform was added in small portions to a cold (5–15° C.) solution of 3-benzoyl-3-azabicyclo-[3.3.1]nonan-6-one (2.489 g., 10.2 mmole) in chloroform (50 ml.) until the solution retained a light yellow color longer than 1–2 minutes. The solution was washed with water, 5% aqueous sodium bicarbonate (remained basic to pH paper), and again with water. The solution was dried (magnesium sulfate) and concentrated to an oil. The oil was crystallized from acetone-Skellysolve B, giving 2.381 g. (7.40 mmole, 72%) of product, M.P. 141–144° C. Two recrystallizations, the last preceded by decolorization with activated charcoal, from acetone-Skellysolve B gave colorless crystals of 3 - benzoyl - 7-bromo-3-azabicyclo[3.3.1]nonan-6 - one, M.P. 147–149° C.; $\nu_{C=O}$ 1715, 1630, $\nu_{C=C}$ 1590, 1575, 1490, $\nu_\phi$ 730, 715, 700 cm.$^{-1}$ in Nujol.

*Analysis.*—Calcd. for $C_{15}H_{16}BrNO_2$ (percent): C, 55.91; H, 5.01; N, 4.35; Br, 24.80. Found (percent): C, 56.09; H, 5.28; N, 4.59; Br, 25.05.

EXAMPLE 46

3-benzoyl-7-methoxy-3-azabicyclo[3.3.1]nonan-6-one

A solution of 3-benzoyl-7-bromo-3-azabicyclo[3.2.2]nonan-6-one (1.888 g., 5.86 mmoles) in methanol was mixed with a solution of sodium hydroxide (0.485 g., 12.1 mmoles) in methanol (25 ml.). The solution was kept in the dark at room temperature for 20 hours. The reaction solution was concentrated under reduced pressure to an oily solid, which was washed with ethyl acetate. The ethyl acetate wash was placed on a column of silica gel (150 g.) packed with ethyl acetate, and eluted with ethyl acetate. Fractions 6–8 were combined in acetone. Addition of Skellysolve B resulted in formation of crystals over a period of about 20 hours. The crystals (0.142 g.) thus obtained were collected and recrystallized from acetone-Skellysolve B to give colorless crystals of 3-benzoyl-7-methoxy-3-azabicyclo[3.3.1]nonan-6-one, M.P. 114–116° C.; $\nu_{C=O}$ 1710, 1625, $\nu_{C=C}$ 1600, 1490, $\nu_\phi$ 775, 745, 700 cm.$^{-1}$ in Nujol; NMR confirmed the assigned structure.

*Analysis.*—Calcd. for $C_{16}H_{19}NO_3$ (percent): C, 70.31; H, 7.01; N, 5.13. Found (percent): C, 70.08; H, 7.25; N, 5.39.

EXAMPLE 47

3-benzoyl-6-(N-pyrrolidyl)-3-azabicyclo[3.2.2]nonane, hydrochloride

A mixture of 3-benzoyl-3-azabicyclo[3.2.2]nonan-6-one (11 g.) 100 ml. of benzene, 16 ml. of pyrrolidine, and 200 mg. of p-toluenesulfonic acid was stirred and heated at reflux under a water trap for 3.5 hours and allowed to stand at 25° for 18 hours. The solvent was removed under reduced pressure on a hot water bath. The residual enamine was taken up in 100 ml. of ethanol and shaken with 1.0 g. of 10% palladium on carbon and hydrogen (40 p.s.i.g.) for 50 minutes. The catalyst was removed by filtration and the combined filtrate and wash solvent was concentrated under reduced pressure. The residue concentrate thus obtained was taken up in 10% hydrochloric acid and extracted with ether. The aqueous acid solution was made basic with 10% sodium hydroxide solution and extracted with ether. This latter extract was dried ($Na_2SO_4$) and concentrated to give 14.6 g. of an oil. The oil was chromatographed over 500 g. of Florisil eluting with 7.8 l. of solvent. Skellysolve B containing increasing proportions of acetone from 0 to 30%, and collecting fractions of 135 ml. each. Cuts 19–55 contained 3-benzoyl-6-(N-pyrrolidyl)-3-azabicyclo[3.2.2]nonane as determined by TLC and IR; these were pooled in either, dried over sodium sulfate and treated with ethereal hydrogen chloride to preciptate the amine hydrochloride, which was recovered, washed with ether, and crystallized from acetone to yield 5.72 g. of 3-benzoyl-6-(N-pyrrolidyl)-3-azabicyclo[3.2.2]nonane, hydrochloride, M.P. 228–230° C.

*Analysis.*—Calcd. for $C_{19}H_{27}N_2OCl$ (percent): C, 68.14; H, 8.13; N, 8.37; Cl, 10.59. Found (percent): C, 68.39; H, 8.38; N, 8.18; Cl, 10.37.

EXAMPLE 48

6-(N-pyrrolidyl)-3-azabicyclo[3.2.2]nonane dimaleate

The 3-benzoyl-6-(N - pyrrolidyl) - 3 - azabicyclo[3.2.2]nonane obtained from 3.5 g. of the corresponding hydrochloride salt obtained from Example 48, above, by treatment with aqueous sodium hydroxide and extraction with ether and drying ($Na_2SO_4$) was added to a stirred mixture of 3.0 g. of LiAlH$_4$ in 100 ml. of ether. The mixture was heated at reflux for two hours, chilled in a cold bath, and decomposed by the addition of 20 ml. of water. After dilution with more ether the mixture was filtered, and the filtrate and ether wash were dried (MgSO$_4$). This solution was made up to 400 ml. with ether and 300 ml. of this solution ether was taken to dryness, the free base thus obtained was dissolved in 50 ml. of ethanol and shaken with 0.5 g. of 10% Pd on C and hydrogen (40 p.s.i.g.) for 17 hours. The catalyst was removed by filtration and the solvent removed under reduced pressure to yield 6-(N-pyrrolidyl)-3-azabicyclo[3.2.2]nonane as an oil. This was made up to 100 ml. with ether. Ten milliliters of this solution was used to precipitate the HCl salt which proved to be very hygroscopic. Two milliliters of ether solution was used to prepare the p-toluenesulfonate by adding a few drops of ethanol solution of p-toluenesulfonic acid.

The remaining ether solution was treated with a methanolic solution of maleic acid to precipitate the maleate salt which was recovered and recrystallized from methanol-methyl ethyl ketone to yield 1.54 g. of 6-(N-pyrrolidyl)-3-azabicyclo[3.2.2]nonane dimaleate, M.P. 167–168° C.

*Analysis.*—Calcd. for $C_{16}H_{26}N_2O_4$ (percent): C, 56.32; H, 7.09; N, 6.57. Found (percent): C, 56.28; H, 7.66; N, 6.70.

EXAMPLE 49

6-methyl-3-azabicyclo[3.2.2]nonan-exo-6-ol, hydrochloride

Ten grams of 3-benzoyl-3-azabicyclo[3.2.2]nonan-exo-6-ol in 200 ml. of tetrahydrofuran was added to a stirred solution of 100 ml. of 3 M methylmagnesium bromide in ether. The mixture was distilled until the vapor temperature was 60° and then heated at reflux for 4.5 hours. The stirred mixture was chilled and treated with 60 ml. of water, followed by 50 ml. of acetic acid and extracted several times with ether. The aqueous solution from the ether extraction was made basic with 50% sodium hydroxide and the resulting gelatinous mixture was continuously extracted with ether, the extract dried ($Na_2SO_4$), and treated with hydrogen chloride. The resulting HCl salt was recovered and washed with ether to yield 3.29 g. of 6-methyl-3-azabicyclo[3.2.2]nonan-exo-6-ol hydrochloride, M.P. 228–230° C., which was recrystallized from methanol ether, M.P. 230–232° C.

*Analysis.*—Calcd for $C_9H_{18}NOCl$ (percent): C, 56.38; H, 9.46; N, 7.30; Cl, 18.50. Found (percent): C, 56.67; H, 9.97; N, 8.09; Cl, 18.63.

EXAMPLE 50

6-phenyl-3-azabicyclo[3.2.2]nonan-exo-6-ol hydrochloride

A solution of 20 g. of 3-benzoyl-3-azabicyclo[3.2.2]nonan-exo-6-ol in 400 ml. of tetrahydrofuran was added to a stirred solution of 200 ml. of 3 M phenylmagnesium bromide in ether. Solvent was removed by distillation until the boiling temperature was 60° and the mixture was heated at reflux for 4.5 hours. After cooling, it was poured onto ice and stirred and acidified with concentrated hydrochloride while continuing to add ice. This mixture was extracted several times with ether. The aqueous acid solution was made basic with 50% sodium hydroxide solution and the resulting mixture was extracted several times with ether. The ether extract was dried (MgSO$_4$), treated with ethereal hydrogen chloride, and the insoluble salt was recovered and washed with ether to yield 15.32 g. This was fractionally crystallized from methanol-methyl ethyl ketone to give about 7.5 g. of 6-phenyl-3-azabicyclo[3.2.2]nonan-exo-6-ol hydrochloride, M.P. 238–240° C. (dec.).

*Analysis.*—Calcd. for $C_{14}H_{20}NOCl$ (percent): C, 66.26; H, 7.94; N, 5.52; Cl, 13.97. Found (percent): C, 66.51; H, 8.17; N, 5.49; Cl, 13.90.

The filtrates from above produced about 2.0 g. of 6-phenyl-3-azabicyclo[3.2.2]nonan-endo - 6 - ol hydrochloride, M.P. 218–220° C. (dec.).

*Analysis.*—Calcd. for $C_{14}H_{20}NOCl$ (percent): C, 66.26; H, 7.94; N, 5.52; Cl, 13.97. Found (percent): C, 66.09; H, 8.33; N, 5.36; Cl, 13.70.

EXAMPLE 51

1,4-dioxa-8-azaspiro[4.6]undecane

A solution of 1,4-dioxa-8-azaspiro[4.6]undecane (0.622 g., 0.00396 mole) in 16% aqueous sodium hydroxide was shaken with hydrogen and 5% palladium-on-carbon (2.50 g.) until the uptake of hydrogen ceased. The catalyst was removed by filtration and washed with methanol. The combined methanol solution was concentrated under reduced pressure to an oil. Simple distillation of the oil gave 5.047 g. (0.0321 mole, 91% yield) of 1,4-dioxa-8-azaspiro[4.6]undecane as a colorless oil, B.P. 58–60° C. (0.05 mm.); $n_D^{25}$ 1.4885; $\nu_{NH}$3330 cm.$^{-1}$ neat.

*Analysis.*—Calcd. for $C_8H_{15}NO_2$ (157.21) (percent): C, 61.12; H, 9.62; N, 8.91. Found (percent): C, 61.17; H, 9.86; N, 8.85.

EXAMPLE 52

8-p-toluenesulfonyl-1,4-dioxa-8-azaspiro[4.6]-undecane

A solution of 1,4-dioxa-8-azaspiro[4.6]undecane (0.622 g., 0.00396 mole) in 16% aqueous sodium hydroxide was mixed with p-toluenesulfonyl chloride (0.786 g., 0.00413 mole). The mixture was shaken vigorously for several minutes, then warmed and shaken more. The mixture was left at room temperature overnight and then was extracted with ether (2× 20 ml.). The ether solution was dried and concentrated to give 8-p-toluenesulfonyl-1,4-dioxa-8-azaspiro[4.6]undecane as an oil.

EXAMPLE 53

1,4-dioxa-9-azaspiro[4.7]dodecane

A solution of 9-benzyl-1,4-dioxa-9-azaspiro[4.7]dodecane (24.642 g., 0.0945 mole) in absolute ethanol (150 ml.) was shaken with 5% palladium-on-carbon (5.88 g.) and hydrogen in a hydrogenation apparatus. After 30 minutes the hydrogen uptake had stopped and totaled 28 pounds (calculated, 27.4 pounds). The catalyst was removed by filtration. The catalyst was washed twice with ethanol. Ethanol was removed from the combined solvent and washes by distillation. The residual oil was purified by a simple distillation which gave 1,4-dioxa-9-azaspiro[4.7]dodecane as a colorless oil (14.447 g., 0.0844 mole, 89%), B.P. 70–75° C. (0.2 mm.); $n_D^{25}$ 1.4835; $\nu_{NH}$3360 cm.$^{-1}$ on the oil.

*Analysis.*—Calcd. for $C_9H_{17}NO_2$ (171.23) (percent): C, 63.13; H, 10.00; N, 8.18. Found (percent): C, 63.31; H, 10.02; N, 8.17.

EXAMPLE 54

1,4-dioxa-8-azaspiro[4.7]dodecane

A solution of 8-benzyl-1,4-dioxa-8-azaspiro[4.7]dodecane (5.152 g., 0.0197 mole) in absolute ethanol (75 ml.) was shaken with 5% palladium-on-carbon (1.5 g.) and hydrogen in a hydrogenation apparatus for 3 hours. Hydrogen uptake was complete after one hour. The catalyst was removed by filtration and was washed twice with methanol. The excess solvent was removed by distillation under reduced pressure. Distillation of the residual oil gave 2.771 g. (0.0162 mole, 82% yield) of 1,4-dioxa-8-azaspiro-[4.7]dodecane as a colorless oil, B.P. 68–69° C. (0.1 mm.); $n_D^{26}$ 1.4853; $\nu_{NH}$3360 m.w. cm.$^{-1}$ on the oil.

Analysis.—Calcd. for $C_9H_{17}NO_2$ (171.23) (percent): C, 63.13; H, 10.00; N, 8.18. Found (percent): C, 63.16; H, 10.04; N, 7.88.

EXAMPLE 55

1,4-dioxa-9-azaspiro[4.8]tridecane

A solution of 9-benzyl-1,4-dioxa-9-azaspiro[4.8]tridecane (9.451 g., 0.0344 mole) in methanol (150 ml.) was shaken with 5% palladium-on-carbon (2.5 g.) in hydrogen for 45 minutes at which time uptake of hydrogen appeared complete. The catalyst was removed by filtration and the colorless filtrate stored overnight in the refrigerator. The solution was concentrated under reduced pressure. The oil thus obtained crystallized as it cooled and the solid was dissolved in ether, decolorized with activated charcoal, filtered and crystallized by addition of hexanes to the ether and by cooling in the freezer to give 4.649 g. of 1,4-dioxa-9-azaspiro[4.8]tridecane (0.0251 mole, 73% yield), M.P. 55–57° C.; recrystallization from ether-hexanes gave colorless, chunky crystals of 1,4-dioxa-9-azaspiro[4.8]tridecane, M.P. 55–57° C.; $\nu_{NH}$ 3400 m.w. cm.$^{-1}$ in Nujol.

*Analysis.*—Calcd. for $C_{10}H_{19}NO_2$ (185.26) (percent): C, 64.83; H, 10.34; N, 7.56. Found (percent): C, 64.66; H, 10.40; N, 7.62.

EXAMPLE 56

3-azabicyclo[3.2.2]nonan-6-one hydrochloride 3-benzyl-3-azabicyclo[3.2.2]nonan-6-one (4.55 g.) was dissolved in 90 ml. of ethanol and shaken with 1.0 g. of 10% palladium-on-carbon and hydrogen (50 p.s.i.g.) for 180 minutes. The catalyst was removed by filtration; the filtrate and wash were concentrated in vacuo to a small volume, diluted with ether, and treated with ethereal HCl. The hydrochloride of the product was recovered, washed with ether and dried; yield, 3.12 g. of 3-azabicyclo[3.2.2]nonan-6-one hydrochloride, M.P. 218–220° C. (dec.); a sample from methanol-ether melted at 227–229° C. (dec.).

*Analysis.*—Calcd. for $C_8H_{13}NO \cdot HCl$ (percent): C, 54.70; H, 8.03; N, 7.98; Cl, 20.19. Found (percent): C, 54.22; H, 8.14; N, 7.98; Cl, 20.64.

EXAMPLE 57

3-azabicyclo[3.2.2]nonan-endo-6-ol hydrochloride

A solution of 9.17 g. of 3-benzyl-3-azabicyclo[3.2.2]nonan-endo-6-ol in 120 ml. of ethanol was shaken with 1.0 g. of 10% palladium carbon and hydrogen (44 p.s.i.g. starting pressure) for 20 hours. The mixture, freed of catalyst and concentrated in vacuo gave 5.60 g. of 3-azabicyclo[3.2.2]nonan-endo-6-ol. A portion of the free base was dissolved in ether and treated with ethereal HCl to precipitate the amine hydrochloride, which was recrystallized from methanol-methyl ethyl ketone to give 3-azabicyclo[3.2.2]nonan-endo-6-ol hydrochloride, M.P. 280° C. (dec.).

*Analysis.*—Calcd. for $C_8H_{16}NOCl$ (percent): C, 54.07; H, 9.08; N, 7.88; Cl, 19.96. Found (percent): C, 54.17; H, 9.05; N, 8.01; Cl, 19.99.

EXAMPLE 58

1,4-dioxa-9-azaspiro[4.7]dodec-9-yl acetonitrile

A solution of 1,4 - dioxa - 9-azaspiro[4.7]dodecane (10.215 g., 0.0597 mole) in benzene (25 ml.) was added slowly to a stirred mixture of chloroacetonitrile (6.0 g., 0.0795 mole) in benzene (125 ml.) and anhydrous sodium carbonate (4.0 g.). During the course of addition (15 minutes), the mixture was warmed to near the reflux temperature and then was heated to reflux with stirring for 18 hours. The precipitate thus obtained was dissolved in dilute aqueous sodium bicarbonate solution. The benzene layer was washed twice with water and dried over magnesium sulfate. Concentration of the benzene under reduced pressure gave an oil which crystallized upon cooling. The crystalline material dissolved in hot Skellysolve B leaving a small amount of gummy, yellow residue and a colorless solution. Cooling gave colorless crystals (8.960 g.), M.P. 77–78° C. A second crop, M.P. 75–77° C. (1.726 g., total 10.686 g., 0.0508 mole, 85% yield) was obtained from the concentrated filtrate. Recrystallization from Skellysolve B gave 1,4-dioxa-9-azaspiro [4.7]-dodec-9-yl acetonitrile as colorless needles, M.P. 78–79° C.; $\nu_{\equiv N}$ 2220 cm.$^{-1}$ in Nujol.

EXAMPLE 59

9-(2-aminoethyl)-1,4-dioxa-9-azaspiro[4.7]dodecane

A solution of 1,4 - dioxa - 9-azaspiro[4.7]dodec-9-yl acetonitrile (8.095 g., 0.0385 mole) in ether (100 ml.) was added dropwise to a mixture of lithium aluminum hydride (5.0 g., 0.13 mole) in ether (200 ml.). The mixture was heated to reflux for three hours with stirring and then was stirred at room temperature for 16 hours. The excess lithium aluminum hydride was decomposed with acetone-water and the inorganic salts removed by filtration. The solids were washed by warming with ether (300 ml.). The combined ether filtrates were dried over magnesium sulfate and concentrated to an oil which was distilled, giving 7.074 g. (0.0330 mole, 86% yield) of 9-(2-aminoethyl)-1,4-dioxa-9 - azaspiro[4.7]dodecane as a colorless oil, B.P. 95–101° C. (0.10 mm.); $n_D^{26}$ 1.4940; $\nu_{NH}$ 3360, 3280 cm.$^{-1}$ on the oil.

*Analysis.*—Calcd. for $C_{11}H_{22}N_2O_2$ (214.30) (percent): C, 61.65; H, 10.35; N, 13.07. Found (percent): C, 61.28; H, 10.48; N, 13.22.

EXAMPLE 60

1-(1-guanidinylethyl)-5-oxoheptamethyleneimine sulfate

Concentrated sulfuric acid (1.17 g., 0.0120 mole) was added to a solution of 9-(2-aminoethyl)-1,4-dioxaspiro-[4.7]dodecane (5.116 g., 0.0239 mole) in water (20 ml.). To this solution, 2-methyl-2-thiopseudourea sulfate (3.34 g., 0.0120 mole) was added and the resulting solution heated to reflux for 16 hours. Addition of ethanol to the cooled solution caused the slow formation of colorless crystals, first crop 4.129 g.; two additional crops formed upon addition of more ethanol, giving 1.595 g. (total 5.724 g., 0.0184 mole, 77% yield) of colorless crystals. The crops were combined and recrystallized twice from water-ethanol to give colorless crystals of 1-(1-guanidinyl-ethyl)-5-oxoheptamethyleneimine sulfate, M.P. turning brown to 300° C.; $\nu_{N^+H}$ 3200 m.s., 3070 s., 2640 m.w., $\nu_{C=N}$ 1680 m.s., 1635 m., 1600 m.w., cm.$^{-1}$ in Nujol.

*Analysis.*—Calcd. for $C_{10}H_{22}N_4O_5S$ (310.38) (percent): C, 38.69; H, 7.15; N, 18.05; S, 10.33. Found (percent): C, 38.82; H, 7.32; N, 18.07; S, 10.27.

EXAMPLE 61

3-cyclohexyl-3-azabicyclo[3.2.2]nonan-endo-6-ol hydrochloride

A mixture of 3.40 g. of 3-azabicyclo[3.2.2]nonan-endo-6-ol, 50 ml. of benzene, 3.0 ml. of cyclohexanone, and 70 mg. of p-toluenesulfonic acid was stirred and heated at reflux for 2.5 hours. The mixture was concentrated to dryness under reduced pressure and the residual oil was taken up in Skellysolve B hexanes and filtered to remove insoluble material. The filtrate was concentrated under reduced pressure to an oil residue of enamine still containing cyclohexanone. This oil in 50 ml. of ethanol was shaken with 1.0 g. of 10% Pd on C and hydrogen (39 p.s.i.g.) for two hours. The catalyst was removed by filtration and the filtrate concentrated under reduced pressure to give a crystalline residue of 3-cyclohexyl-3-azabicyclo[3.2.2]-endo-6-ol which was dissolved in ether and treated with ethereal hydrogen chloride; the resulting HCl salt was recovered and recrystallized from methanol-methyl ethyl ketone; yield, 3.43 g. of 3-cyclohexyl-3-azabicyclo[3.2.2]nonan-endo-6-ol, M.P. >265° C. (dec.).

*Analysis.*—Calcd. for $C_{14}H_{26}NOCl$ (percent): C, 64.71; H, 10.01; N, 5.39; Cl, 13.65. Found (percent): C, 64.60; H, 10.21; N, 5.39; Cl, 13.74.

We claim:
1. The process for the introduction of oxygen into a compound of the formula:

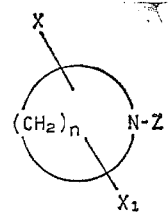

wherein $n$ is a whole number from 4 to 12, inclusive, X and $X_1$ are each selected from the group consisting of hydrogen, methyl, ethyl and propyl and X and $X_1$ taken together constitute a bridge containing from 1 to 3 carbon atoms, inclusive, and Z is selected from the group consisting of

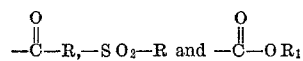

in which R is an aryl substituent of 6 to 12 carbon atoms, inclusive, and R( is an aralkyl substituent of 7 to 16 carbon atoms, inclusive, which comprises subjecting said compound to the oxygenating activity of *Sporotrichum sulfurescens.*

2. The process of claim 1, wherein the oxygenation is carried out in an aqueous nutrient medium under submerged aerobic fermentation conditions.

3. The process of claim 1, wherein the oxygenation is carried out in an aqueous nutrient medium under submerged aerobic fermentation conditions and the fermentation is continued until a substantial amount of oxygenated products are produced and the oxygenated products thus obtained are recovered from the fermentation medium.

4. The process for the production of an oxygenated compound of the formula:

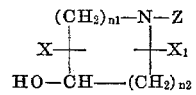

wherein $n_1$ is a whole number from 1 to 5, inclusive, $n_2$ is a whole number from 2 to 8, inclusive, and in which the sum of $n_1$ and $n_2$ is not less than 3 and not more than 11; X and $X_1$ are each selected from the group consisting of methyl, ethyl, and propyl and X and $X_1$ taken together constitute a bridge containing from 1 to 3 carbon atoms, inclusive, and Z is selected from the group consisting of

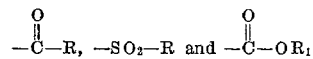

in which R is an aryl substituent of 6 to 12 carbon atoms, inclusive, and $R_1$ is an aralkyl substituent of 7 to 16 carbon atoms, inclusive, which comprises subjecting a compound of the formula:

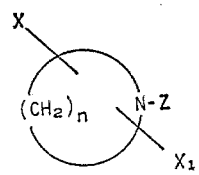

wherein $n$ is a whole number from 4 to 12, inclusive, and X, $X_1$ and Z are defined as above, to the oxygenating activity of *Sporotrichum sulfurescens.*

5. The process of claim 4, wherein the oxygenation is carried out in an aqueous nutrient medium under submerged aerobic fermentation conditions.

6. The process of claim 4, wherein the oxygenation is carried out in an aqueous nutrient medium under submerged aerobic fermentation conditions, the fermentation is continued until a substantial amount of oxygenated products is produced and the oxygenated products thus obtanied are recovered from the fermentation medium.

7. The process of claim 4, wherein 1-benzoylhexamethyleneimine is subjected to the oxygenating activity of *Sporotrichum sulfurescens* in an aqeous nutrient medium under aerobic fermentation conditions to obtain 1-benzyol-3-oxohexamethyleneimine and 1-benzoyl-4-oxohexamethyleneimine.

8. The process of claim 4, wherein 1-(p-toluenesulfonyl-hexamethyleneimine is subjected to the oxygenating activity of *Sporotrichum sulfurescens* in an aqueous nutrient medium under aerobic fermentation conditions to obtain 1-(p-toluenesulfonyl)-4-hydroxyhexamethyleneimine.

9. The process of claim 4, wherein 1-benzoylheptamethyleneimine is subjected to the oxygenating activity of *Sporotrichum sulfurescens* in an aqueous nutrient medium under aerobic fermentation conditions to obtain 1-benzoyl-4-hydroxyheptamethyleneimine and 1-benzoyl-5-hydroxyheptamethyleneimine.

10. The process of claim 4, wherein 1-(p-toluenesulfonyl)-heptamethyleneimine is subjected to the oxygenating activity of *Sporotrichum sulfurescens* in an aqueous nutrient medium under aerobic fermentation conditions to obtain 1-(p-toluenesulfonyl) - 4 - hydroxyheptamethyleneimine.

11. The process of claim 4, wherein 1-benzoyloctamethyleneimine is subjected to the oxygenating activity of *Sporotrichum sulfurescens* in an aqueous nutrient medium under aerobic fermentation conditions to obtain 1-benzoyl-4-hydroxyoctamethyleneimine and 1 - benzoyl - 5-hydroxyoctamethyleneimine.

12. The process of claim 4, wherein 1-benzoyldodecamethyleneimine is subjected to the oxygenating activity of *Sporotrichum sulfurescens* in an aqueous nutrient medium under aerobic fermentation conditions to obtain 1-benzoyl-5-hydroxydodecamethyleneimine, 1 - benzoyl-6-hydroxydodecamethyleneimine, and 1-benzoyl-7-hydroxydodecamethyleneimine.

13. The process of claim 4, wherein bispentamethyleneurea is subjected to the oxygenating activity of *Sporotrichum sulfurescens* in an aqueous nutrient medium under aerobic fermentation conditions to obtain 1-pentamethylenecarbamyl-4-hydroxypiperidene.

14. The process of claim 4, wherein 2-benzoyl-2-azabicyclo[2.2.2]octane is subjected to the oxygenating activity of *Sporotrichum sulfurescens* in an aqueous nutrient medium under aerobic fermentation conditions to obtain 2-benzoyl-5-hydroxy-2-azabicyclo[2.2.2]octane.

15. The process of claim 4, wherein 3-benzoyl-3-azabicyclo[3.2.2]nonane is subjected to the oxygenating activity of *Sporotrichum sulfurescens* in an aqueous nutrient medium under aerobic fermentation conditions to obtain 3-benzoyl-3-azabicyclo[3.2.2]nonan-6-one and 3-benzoyl-3-azabicyclo[3.2.2]nonan-6-ol.

16. The process of claim 4, wherein benzyl 3-azabicyclo[3.2.2]nonane-3-carboxylate is subjected to the oxygenating activity of *Sporotrichum sulfurescens* in an aqueous nutrient medium under aerobic conditions to obtain benzyl 6-hydroxy-3-azabicyclo[3.2.2]nonane - 3 - carboxylate.

17. The process of claim 4, wherein 3-benzoyl-3-azabicyclo[3.2.1]nonane is subjected to the oxygenating activity of *Sporotrichum sulfurescens* in an aqueous nutrient medium under aerobic fermentation conditions to obtain 3-benzoyl-3-azabicyclo[3.3.1]nonan-6-ol.

References Cited
UNITED STATES PATENTS 3,392,171   7/1968   Fonken et al. _____ 195—51

ALVIN E. TANENHOLTZ, Primary Examiner

U.S. Cl. X.R.

260—239, 293.4, 294, 294.3, 294.7, 302, 326.3, 326.5; 424—267, 269

UNITED STATES PATENT OFFICE
CERTIFICATE OF CORRECTION

Patent No. 3,556,943            Dated January 19, 1971

Inventor(s) Gunther S. Fonken, Milton E. Herr, Herbert C. Mur

It is certified that error appears in the above-identified patent and that said Letters Patent are hereby corrected as shown below:

Column 29, line 4, for "of 1,4-" read --of 8-benzyl-1,4- Column 29, lines 4-5, for "(0.622 g., 0.00396 mole) in 16% aqueous sodium hydroxide was shaken" read --(8.692 g., 0.0352 mole) in methanol (130 ml.) was shaken--. Column 32, line 2¹ for "R(" read --$R_1$--.

Signed and sealed this 22nd day of June 1971.

(SEAL)
Attest:

EDWARD M. FLETCHER, JR.          WILLIAM E. SCHUYLER, JR.
Attesting Officer                  Commissioner of Patents